US010739752B2

(12) United States Patent
Zhao et al.

(10) Patent No.: US 10,739,752 B2
(45) Date of Patent: *Aug. 11, 2020

(54) COMPUTER SYSTEM AND METHOD FOR CAUSALITY ANALYSIS USING HYBRID FIRST-PRINCIPLES AND INFERENTIAL MODEL

(71) Applicant: Aspen Technology, Inc., Bedford, MA (US)

(72) Inventors: Hong Zhao, Sugar Land, TX (US); Ashok Rao, Sugar Land, TX (US); Mikhail Noskov, Acton, MA (US); Ajay Modi, Newton, MA (US)

(73) Assignee: Aspen Technologies, Inc., Bedford, MA (US)

( * ) Notice: Subject to any disclaimer, the term of this patent is extended or adjusted under 35 U.S.C. 154(b) by 244 days.

This patent is subject to a terminal disclaimer.

(21) Appl. No.: 16/014,280

(22) Filed: Jun. 21, 2018

(65) Prior Publication Data

US 2018/0299862 A1 Oct. 18, 2018

Related U.S. Application Data

(63) Continuation of application No. 15/141,701, filed on Apr. 28, 2016, now Pat. No. 10,031,510.

(Continued)

(51) Int. Cl.
*G05B 19/406* (2006.01)
*G05B 17/02* (2006.01)
*G05B 23/02* (2006.01)

(52) U.S. Cl.
CPC .......... *G05B 19/406* (2013.01); *G05B 17/02* (2013.01); *G05B 23/0243* (2013.01); *G05B 23/0254* (2013.01); *G05B 23/0281* (2013.01)

(58) Field of Classification Search
CPC .............. G05B 19/406; G05B 23/0243; G05B 23/0281; G05B 23/0254; G05B 17/02
See application file for complete search history.

(56) References Cited

U.S. PATENT DOCUMENTS 6,278,962 B1 8/2001 Klimasauskas
7,330,804 B2 2/2008 Turner
(Continued)

FOREIGN PATENT DOCUMENTS

WO 2016178955 11/2016

OTHER PUBLICATIONS

International Preliminary Report on Patentability for PCT/US2016/029978 dated Nov. 7, 2017 entitled "Computer System and Method for Causality Analysis Using Hybrid First-Principles and Inferential Model".

(Continued)

*Primary Examiner* — Ziaul Karim
(74) *Attorney, Agent, or Firm* — Hamilton, Brook, Smith & Reynolds, P.C.

(57) ABSTRACT

Computer-based methods and system perform root-cause analysis on an industrial process. A processor executes a hybrid first-principles and inferential model to generate KPIs for the industrial process using uploaded process data as variables. The processor selects a subset of the KPIs to represent an event occurring in the industrial process, and divides the selected data into time series. The system and methods select time intervals from the time series based on data variability and perform a cross-correlation between the loaded process variables and the selected time intervals, resulting in a cross-correlation score for each loaded process variable. Precursor candidates from the loaded process variables are selected based on the cross-correlation scores, and a strength of correlation score is obtained for each precursor candidate. The methods and system select root-cause variables from the selected precursor candidates based on the strength of correlation scores, and analyze the root-cause of the event.

17 Claims, 20 Drawing Sheets

Related U.S. Application Data

(60) Provisional application No. 62/156,024, filed on May 1, 2015.

(56) References Cited

U.S. PATENT DOCUMENTS

| | | | |
|---|---|---|---|
| 7,630,868 B2 | 12/2009 | Turner | |
| 9,141,911 B2 | 9/2015 | Zhao | |
| 10,031,510 B2 | 7/2018 | Zhao et al. | |
| 2004/0250166 A1 | 12/2004 | Dahlquist | |
| 2008/0281557 A1 | 11/2008 | Emigholz | |
| 2008/0297513 A1* | 12/2008 | Greenhill | G06Q 99/00 345/440 |
| 2012/0003623 A1* | 1/2012 | Bartee | G05B 17/02 435/3 |
| 2012/0239164 A1* | 9/2012 | Smith | G06Q 10/067 700/17 |
| 2012/0239169 A1* | 9/2012 | Smith | G05B 17/02 700/83 |
| 2013/0073062 A1* | 3/2013 | Smith | G06Q 10/04 700/33 |
| 2013/0246316 A1 | 9/2013 | Keenan | |
| 2013/0282641 A1 | 10/2013 | Martin | |
| 2014/0128996 A1* | 5/2014 | Sayyarrodsari | G05B 19/41885 700/29 |
| 2014/0365195 A1 | 12/2014 | Lahiri | |
| 2015/0077263 A1* | 3/2015 | Ali | G05B 11/06 340/679 |

OTHER PUBLICATIONS

International Search Report and Written Opinion for PCT/US2016/029978 dated Aug. 25, 2016 entitled "Computer System and Method for Causality Analysis Using Hybrid First-Principles and Inferential Model".

Pantelides C. C. and Renfro J. G, "The online use of first-principles models in process operations: Review, current status & future needs", Computers & Chemical Engineering, vol. 51, ISSN: 0098-1354, pp. 136-148 (2013).

N. Bhutani, G. P. Rangaiah, and A. K. Ray, "First-Principles, Data-Based, and Hybrid Modeling and Optimization of an Industrial Hydrocracking Unit", Ind. Eng. Chem. Res., 2006, 45 (23), pp. 7807-7816.

Dan Hebert, "First-Principle Versus Data-Driven Models", controlglobal. corn, Jun. 12, 2008.

Zhao Hong, et al. "Modeling of Activated Sludge WasteWater Treatment Processes Using Integrated Neural Networks and a First Principle Model", IFAC, 13th World Congress, 1996, pp. 1-5.

Zhao Hong, et al. "A nonlinear industrial model predictive controller using integrated PLS and neural net state-space model", Control Engineering Practice, vol. 9, pp. 125-133 (2001).

Benner, Peter, and Fassbender, Heike, "Model Order Reduction: Techniques and Tools", Encyclopedia of Systems and Control, Springer, doi:10.1007/978-1-4471-5102-9_142-1, ISBN 978-1-4471-5102-9, pp. 1-10 (2014).

Qin, S. Joe, "An overview of subspace identification", Computer and Chemical Engineering, vol. 30, pp. 1502-1513 (2006).

Zhao, Hong, et al. "Improved Closed-Loop Subspace Identification Technology for Adaptive Modeling and APC Sustained Value", AIChE Spring Meeting, Apr. 1-5, 2012.

Garthwaite, Paul H., "An Interpretation of Partial Least Squares", Journal of the American Statistical Association, vol. 89 (425), pp. 122-127 (1994).

International Search Report and Written Opinion for PCT/US2018/035611 dated Aug. 24, 2018 entitled "Computer System and Method for Building and Deploying Predictive Inferential Models Online".

* cited by examiner

PROCESS ANALYTICS : STEP 2
USE GENERIC INFERENTIAL MODELING TO ESTIMATE FLOODING CONTINUALLY
(BETWEEN STEADY-STATE REGIMES)

< Inferential Model    New Inferential Model

IM-G-73    Search   🔍    T-560   🔍    Analytics    C2 Splitter

Dependent Variable [C25_A_FLD_FAC] 🔍

Independent Variables

| Variable Type | |
|---|---|
| Tag | C2S_REFL_RATIO |
| Tag | C2S_MASS_FLOW |
| Tag | C2S_TOTAL_FLOW |
| Tag | C2S_MOLE_FRAC |
| Tag | C2S_CARBO_01 |
| Tag | C2S_ACETY_01 |
| Tag | C2S_METHA_FRAC |

- Tag
- Delta
- Sum
- Average
- REFPCT
- PFPCT

USER SELECTED RAW AND DERIVED
MEASUREMENTS FOR INFERENTIAL MODEL

Data Analysis

| Start Time | End Time |
|---|---|
| 02/01/2015 12:01 AM | 02/11/2015 11:46 PM |

Predict the quality
to [C2S_A_FLD_FAC]
every [1] minute(s)

Build Model    Save

Data Fit Quality: Good (99.74%)
(99.99%) of 575 samples used
0 10 20 30 40 50 60 70 80 90 100

FIG. 6C

COMPUTER SYSTEM AND METHOD FOR CAUSALITY ANALYSIS USING HYBRID FIRST-PRINCIPLES AND INFERENTIAL MODEL

RELATED APPLICATION

This application is a continuation of U.S. application Ser. No. 15/141,701, filed on Apr. 28, 2016, which claims the benefit of U.S. Provisional Application No. 62/156,024, filed on May 1, 2015. The teachings of the above applications are incorporated herein by reference in their entirety.

BACKGROUND OF THE INVENTION

Although normal chemical or petro-chemical plant operations are controlled using Advanced Process Control (APC) and are optimized with Real-Time Optimization (RTO), a large number of undesirable plant events still occur in processes at chemical or petro-chemical plants, which cost the process industry billions of dollars per year. These undesirable plant events include unexpected unit operation breakdown or plant shutdown due to equipment problems, feed materials quality change, faulty sensors/actuators, and human operation errors. Because of the large number of undesirable plant events, the development of root-cause-analysis technology that leads to quick and efficient identification of the root causes of these events would be of extreme benefit to the process industry. However, chemical and petro-chemical plants measure a formidable number of process variables in relation to plant events. As such, performing root-cause-analysis on a particular plant event using the historian dataset for these measured process variables presents a challenge for process engineers and operators. Prior art systems lack tools for quickly and efficiently performing root-cause-analysis on such a formidable number of measured process variables.

Further, prior art systems lack effective online models, such as first principles models, to calculate event indicators for identifying particular process variables to use in root-cause-analysis of a plant event. First principles models have been widely used offline in petroleum, chemical, and process industries for process design, simulation, and optimization over the last 30 years because of their accuracy and transparency in fundamental physical and chemical principles. Commercial engineering software for offline applications using first principles models have advanced tremendously over the last 30 years, and during this time, efforts have been made to also use first principles models online for real-time applications, such as online process optimization and control. First principles models have many well-known advantages over black-box models that are typically used online. These advantages include being more rigorous and reliable for simulating and predicting process behavior, providing broader coverage of complex nonlinearities, and providing better extrapolations. Using first principles models online to calculate or predict key performance indicators (KPIs) has been a long time goal for many process engineers and operators. However, efforts to use a first principles model online for real-time event prediction, prevention and root-cause-analysis applications have been a challenging task, and for prior art systems there still exists a gap between theory and practice.

SUMMARY OF THE INVENTION

The present invention addresses the difficulties in performing root-cause-analysis for a typical plant process involving a formidable number of process variables. The difficulties for prior art systems to perform root-cause-analysis come from several factors. First, undesirable plant events in a process at a chemical or petro-chemical plant are challenging for prior art systems to analyze because the events may not occur consistently, or even be repeatable, in the process history, and are often discrete in time. As such, prior art systems are not able to determine direct correlations between the events and the continuous plant operational historian data from the process. Second, a typical process unit consists of thousands of measurable variables, and determining specific key root-cause variables from such a large number of process data is a daunting task for process engineers and operators. Third, even though only a small number of process variables may be root-cause variables for the event, prior art systems lack efficient tools for performing the task of calculating the causal correlation strength of each process variable to the event based on relative sensitivities, contributions, and event lead-time, as required to identify the process variables as potential root-cause variables.

Embodiments of the present invention first address several difficulties in using first principles models online for root-cause-analysis. First, a full scale of a first-principles dynamic model for plant off-line simulation was usually constructed with very high complexity, typically consisting of a formidable number of variables and model parameters (e.g., 12,000 variables plus 12,300 parameters for a single C2 splitter distillation column). Applying such a full scale first-principle dynamic model to online applications will be difficult and costly in term of time and efforts needed. Second, the model needs to be calibrated with plant operational data, but sufficient raw plant operational data needed to calibrate such a complex dynamic model may not be available, as usually only limited historical process data can be used for model calibration. To reduce the complexity of using a full-scale dynamic model and lower the requirements on plant data availability, a steady-state first-principles model is instead used in embodiments of the present invention.

Further, once the steady-state first-principles model was calibrated, the online prediction may only be generated at a steady-state. That is, the first-principles model only provides discrete-time (non-continuous) calculations when the process detects reaching a steady-state. As such, the calculation or estimation/prediction of KPIs from the first-principles models are valid only when the process/model reaches a steady-state, but steady-states can be found only at certain periods over the plant historical operation data. Therefore, usually only scattered data points over the time series of multivariate process variables are qualified and used to calculate model/predict steady-state KPIs. In practice, the continuous calculation or estimation of various process KPIs are more desirable, for example, a distillation column's flooding risk factor will be extremely important for an operator to watch and monitor continuously, such that once the risk factor gets close to a critical threshold, an early warning may be triggered, and corresponding actions may be taken so that the unwanted plant shutdown due to column flooding can be prevented timely.

The present invention is directed to a computer system and methods for performing root-cause-analysis of undesirable plant events. As the first step, embodiments of the present invention are directed to the use of a hybrid online first principle model combined with in empirical inferential model to generate continuous KPIs for representing the undesirable plant events. For example, the undesirable event of a distillation column flooding may be represented by flooding risk factors KPIs generated online by a hybrid first principles model. In some embodiments, other measurements may be used together with KPIs, or instead of KPIs, to represent undesirable process events.

The computer system and methods may build, calibrate, and deploy a hybrid first principles and inferential model online to generate continuous KPIs for representing plant events. The present invention provides an approach that allows preserving the advantages of first principles models for real-time applications. Unlike prior approaches, the system and methods of the present invention combine the traditional first principles model for reliable and accurate KPI calculation at steady-state, with an empirical inferential model for continuous estimation or prediction of the KPIs between the steady-state operation points. In this way, a hybrid model may provide reliable, accurate and continuous KPI value estimations in an online application. The invention allows process engineers and operators to deploy numerous well-developed first principles models online for KPI calculation and real-time prediction estimation, providing a powerful solution to many issues faced at the plant.

In this approach, the first-principles model and the inferential model are first constructed in an offline mode for model calibration and inferential building. Specifically, a scalable first principles model for a single process unit (e. g., distillation column, reactor, furnace, and the like) is built and calibrated with plant historical operation data and initiated from a plant database (i.e., historian database or historian). A dataset consisting of model required measurements from a plant operation historian is retrieved and auto-data-slicing is applied to the dataset for data preprocessing and data selection (see U.S. Pat. No. 9,141,911 B2, which is incorporated herein by reference in its entirety). Further, a model calibration procedure is implemented to calibrate the first-principles process model based on the dataset, and a steady-state detection module is used to find out where the unit (process) reached a steady-state among the dataset. Once a first-principles model is calibrated, the model is used to generate steady-state KPI values, which are usually unmeasured or difficult to measure, but very important for the process engineer/operator to keep the process operation safe or at an optimal operation condition, such as distillation columns' flooding risk factor, column efficiency, output product quality, reactors' conversion efficiency or a furnace energy consumption rate, etc. In order to overcome the limitations of a single first-principles model between steady-state periods, a complementary inferential model acts as a bridge to generate estimations of KPIs between any two steady-state periods. This resolves the continuous KPI estimation problem and works with the first-principles model in a synergistic way. The inferential model is built with a partial least squares (PLS) linear or neural network (NN) nonlinear model by using the steady-state KPI data as model output and selected measurable process variables data as model inputs from a historical operation dataset.

Then, the models are used together online as a hybrid model or analyzer to generate continuous KPIs as output. The hybrid model or analyzer may generate continuous KPIs to represent the closeness measure to plant events, including undesirable plant events, as part of a root-cause analysis system. The system and methods further provide for periodic online model calibrations and automatic inferential model adaptations for maintaining the model when the process operation scheme changes. In this manner the present invention may provide up-to-date process KPIs to reflect the changes in process equipment and/or operation conditions.

As a result, the unit (process) operation becomes more transparent to process engineers and/or operators than before and enable them to address many practical operational performance issues of today, such as preventing column flooding and avoiding unwanted plant shutdown.

The computer system and methods may then use the continuous KPI values relevant to a particular undesirable plant event (i.e., event-relevant KPIs) to search for precursor candidates for the undesirable plant event from the thousands of process variables measurements. The search may be performed by a search engine configured as part of a root-cause analyzer, which is communicatively coupled to the hybrid model. A KPI may be determined as an event-relevant KPI because it highly correlates to the particular undesirable plant event, such as selecting the estimated flooding factor of a distillation column KPI for column flooding events or selecting the column separation efficiency KPI for column fouling events. The event-relevant KPIs may be used to indicate the risk level of the undesirable plant events, and further to facilitate the search (e.g., a target signal precursor search (TSPS)) to identify precursor variable candidates among the thousands of process variable measurements potentially related to the undesirable events in the plant historian. To perform a search, the system and methods may first divide values of the event-relevant KPIs into multiple sets of time series, and time intervals of each subset of time series may be selected for searching for precursor candidates for the event (i.e., precursor candidates) based on data variability in the time interval. The time intervals may be defined based on large value variations in the data over time or different operating levels for the subset of KPIs. Note, the system and methods may load the process variables measurements from the historian database (i.e., the historical operation dataset) as the precursor candidates for a specific undesirable plant event. A special data screening and pre-processing method (see e.g., U.S. Pat. No. 9,141,911 B2, which is incorporated herein by reference in its entirety) may be applied to the historical operation dataset to obtain auto-preprocessed clean data for the precursor search.

The system and methods may then perform a cross-correlation analysis between the loaded process variables and the event-relevant KPIs of the selected time intervals, and thereby calculate a correlation score for each loaded process variable. The system and methods may perform the cross-correlation analysis by first performing an elimination of one or more loaded process variables based on a global correlation threshold. The system and methods may then calculate correlation scores for the process variables remaining after the first elimination, wherein the initial cross-correlation scores are calculated by evaluating the positive and negative intervals for each respective time interval. The system and methods may then accumulate the cross-correlation scores for each remaining process variable such that the accumulated cross-correlation score for each remaining process variable is calculated over all the selected time intervals, wherein performing a second elimination of one or more of the remaining process variables based on the accumulated cross-correlation scores. The system and methods may select precursor candidates from the process variables remaining after the second elimination. The selection of the precursor candidates may be based on calculating rolling lag times over the entire time series for each of the remaining process variables using multi-window correlations, which allows quick eliminations of many precursor candidates from the thousands of loaded process variables.

As a result of the precursor search, only a small set of the loaded process variables are found highly-correlated to the KPIs, which are then identified as precursor candidates for continued analysis. The system and methods may then apply qualitative and quantitative analysis to more granularly investigate the identified precursor candidates to determine the impacts of each candidate. The analysis includes building a quantitative parametric dynamic model, such as a multiple-input single output (MISO) dynamic parametric model, between the candidate precursors and event-relevant KPIs to identify root-cause variables from the precursor candidates. The analysis may be performed by a final parametric dynamic analyzer configured as part of a root-cause analyzer, which may be communicatively coupled to the search engine and hybrid analyzer also configured as part of the root-cause analyzer. Prior to building the model, the system and methods may analyze x-y linear relationships between the selected precursor candidates and the subset of KPIs, wherein a transform may be applied to any of the selected precursor candidates determined as having high nonlinearity to the KPIs based on the analysis. The system and methods may then build the quantitative parametric dynamic model with the selected precursor candidates as input and the subset of KPIs as output. The parametric model may be structured as a linear state space model, partial least squares (PLS) linear model, or piecewise linear model. Using the parametric model, the system and methods estimate dead-times and dynamic linear filters for each input channel of the parametric model. The dead-time may be estimated using an optimization search based on input to the subset of KPIs. Further, the dynamic linear filters may be estimated using a linear reduction technique to determine optimal low-order model fittings.

Then using the estimated dead-times and filters, the system and methods may rebuild the final parametric model as a partial least squares (PLS) model to perform quantitative analysis of the selected precursor candidates. More specifically, using the PLS model, the system and methods may calculate a score for each selected precursor candidate based on strength of correlation to the subset of the KPIs, including relative sensitivities, contributions, and event lead-time for the selected precursor variable candidates. The strength of correlation score may be calculated using PLS regression and sensitivity analysis techniques. The system and methods may select root-cause variables from the selected precursor candidates based on the respective calculated strength of correlation score. In addition, the selected precursor candidates may be sorted and ranked according their strength of correlation score, and may be presented, along with their relative sensitivities, contributions, and lead-times to process engineers and operators for confirmation and rejection as root-cause variables.

Using the ranked list as a signature in diagnosing plant operation defects, the process engineers and operators may quickly further narrow the results of the root-cause search and determine whether each system presented root-cause variable is the actual cause of an operation problem based on their knowledge of the process. Further, the process engineers and operators may also use this information to better understand unexpected events, focus the investigation of an undesirable plant event on the system presented root-cause variables, and take early actions, if necessary, based on the KPI-related monitoring and alarming. As a result, the information may lower the risks of reoccurrence of the events, and ultimately prevent the undesirable events from future operations and reduce the economic loss in manufactory plants. As such, the system and methods provide process engineers and operators with a highly efficient tool for event causality analysis in various process industry applications, including but not limited to, undesirable events root-cause analysis, operational trouble-shooting, and process faults detection and identification, as well as plant risk management.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 6A-6I illustrate an application example of a C2 splitter depicting the performance of root cause analysis using the example methods in FIGS. 2A, 4, and 5A-5B.

DETAILED DESCRIPTION OF THE INVENTION

A description of example embodiments of the invention follows. As used herein "Partial Least Squares" and "Projection Latent Structure" are used interchangeably and are both referenced by the abbreviation "PLS".

In example embodiments, the present invention may use continuous KPIs as indicators in performing root-cause-analysis of undesirable plant events. In some of these example embodiments, the present invention may use a hybrid analyzer including a primary first principles model or analyzer (i.e., first principles model) and a secondary dynamic inferential model or analyzer (i.e., inferential model) connected in parallel to calculate the continuous KPIs. In other example embodiments, (1) the hybrid analyzer may include a first principles model coupled with a different secondary model, (2) the hybrid analyzer may be configured with the models connected in other non-parallel configurations, and (3) the models may calculate other measures than KPIs. In yet other embodiments, the present invention may use other analyzers, which includes other models besides first principles models, to calculate the KPIs or other estimations of certain properties of an industrial process as indicators.

Example Network Environment for Plant Processes

Figure 1:
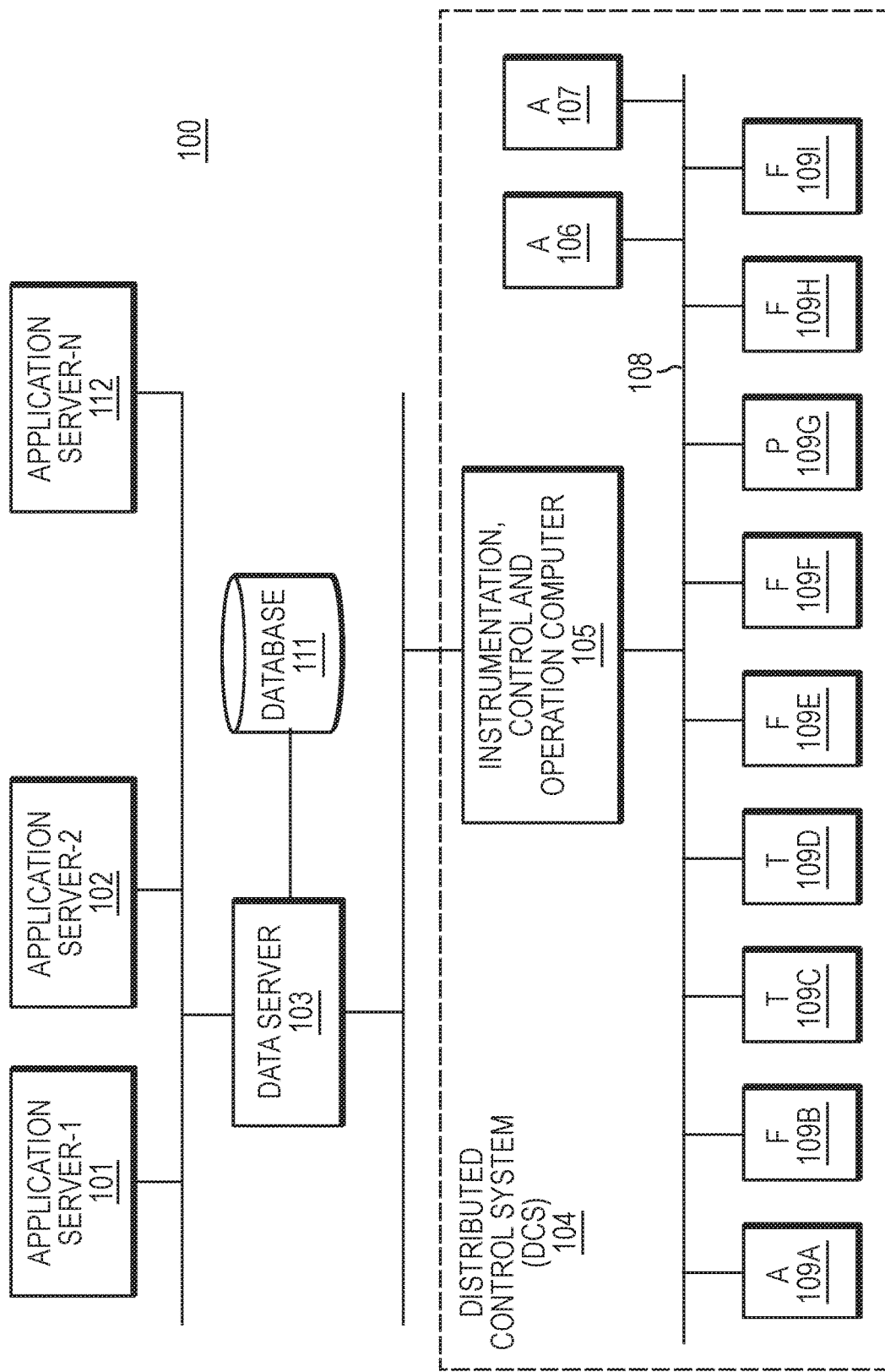
FIG. 1 illustrates a block diagram depicting an example network environment for data collection and monitoring of a plant process in embodiments of the present invention.

FIG. 1 illustrates a block diagram depicting an example network environment 100 for monitoring plant processes in embodiments of the present invention. System computers 101, 102 may operate as a root-cause analyzer. In some embodiments, each one of the system computers 101, 102 may operate in real-time as the root-cause analyzer of the present invention alone, or the computers 101, 102 may operate together as distributed processors contributing to real-time operations as a single root-cause analyzer. In other embodiments, additional system computers 112 may also operate as distributed processors contributing to the real-time operation as a root-cause analyzer. In some embodiments, system computers 101, 102, 112 operating as the root-cause analyzer may be configured with a hybrid model, search engine, and a parametric analyzer. The hybrid model may be configured with a first principles model and an inferential model. The parametric analyzer may be configured with a multiple-input single output (MISO) dynamic parametric model.

The system computers 101 and 102 may communicate with the data server 103 to access collected data for measurable process variables from a historian database 111. The data server 103 may be further communicatively coupled to a distributed control system (DCS) 104, or any other plant control system, which may be configured with instruments 109A-109I, 106, 107 that collect data at a regular sampling period (e.g., one sample per minute) for the measurable process variables, 106,107 are online analyzers (e.g., Gas Chromatographs or GC) that collect data at a longer sampling period. The instruments may communicate the collected data to an instrumentation computer 105, also configured in the DCS 104, and the instrumentation computer 105 may in turn communicate the collected data to the data server 103 over communications network 108. The data server 103 may then archive the collected data in the historian database 111 for model calibration and inferential model training purposes. The data collected varies according to the type of target process.

The collected data may include measurements for various measureable process variables. These measurements may include a feed stream flow rate as measured by a flow meter 109B, a feed stream temperature as measured by a temperature sensor 109C, component feed concentrations as determined by an analyzer 109A, and reflux stream temperature in a pipe as measured by a temperature sensor 109D. The collected data may also include measurements for process output stream variables, such as the concentration of produced materials, as measured by analyzers 106 and 107. The collected data may further include measurements for manipulated input variables, such as reflux flow rate as set by valve 109F and determined by flow meter 109H, a re-boiler steam flow rate as set by valve 109E and measured by flow meter 109I, and pressure in a column as controlled by a valve 109G. The collected data reflect the operation conditions of the representative plant during a particular sampling period. The collected data is archived in the historian database 111 for model calibration and inferential model training purposes. The data collected varies according to the type of target process.

In FIG. 1, the system computer 101 and 102 may execute a first principles model and inferential model for online deployment purposes. The output values generated by the hybrid model on the system computer 101 may provide to the instrumentation computer 105 over the network 108 for operator to view, or may be provided to automatically program any other component of the DCS 104, or any other plant control system or processing system coupled to the DCS system 104. Alternatively, the instrumentation computer 105 can store the historical data 111 through the data server 103 in the historian database 111 and execute the hybrid model in a stand-alone mode. Collectively, the instrumentation computer 105, the data server 103, and various sensors and output drivers (e.g., 109A-109I, 106, 107) form the DCS 104 and work together to implement and run the presented application.

The example architecture 100 of the computer system supports the process operation of the present invention in a representative plant. In this embodiment, the representative plant may be a refinery or a chemical processing plant having a number of measurable process variables such as temperature, pressure and flow rate variables. It should be understood that in other embodiments the present invention may be used in a wide variety of other types of technological processes or equipment in the useful arts.

Hybrid Analyzer Process

Figure 2A:
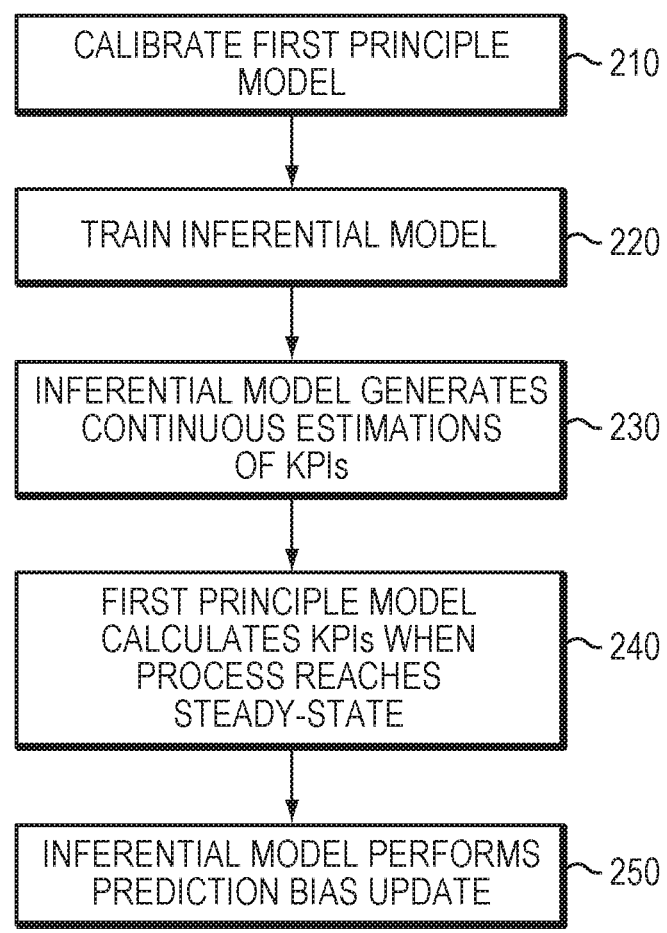
FIG. 2A illustrates a flowchart of an example method for a hybrid analyzer to generate KPIs in embodiments of the present invention.

FIG. 2A illustrates a flowchart of an example method 200 for a hybrid analyzer 260 to calculate KPIs. In some embodiments, the hybrid analyzer 260 may be configured as part of a root-cause analyzer, such as on system computers 101, 102 of FIG. 1. The calculated KPIs may be relevant to particular plant events, such as undesirable plant events. The method 200 begins by the hybrid analyzer 260 calibrating a first principles model at step 210 of FIG. 2A. In some embodiments, the hybrid analyzer 260 may select the first principles model from multiple available models for calculating KPIs, and in other embodiments the hybrid analyzer 260 may be provided with a single first principles model for calculating KPIs. In the embodiment of FIG. 2A, the first principles model is a steady-state process/unit simulation model, but in other embodiments, the first principles model may be another simulation model. The first principles model is calibrated using historical plant operation data as training data to calculate process operation KPI values at a steady-state. In other embodiments, other plant operation data may be used as training data. The training data for the model calibration are generated by various components of a manufacturing plant and are sampled using a plurality of sensors (e.g., 109A-109I, 106, 107) strategically placed in the plant and are stored in a historian database 111 as plant operation historian data, as shown in FIG. 1. In some embodiments, the training data may be stored in other locations in memory. The hybrid analyzer 260 may include a variable selection component for selecting one or more measurable process variables from the training data as input data for performing the model calibration.

Typically a first principles model may contain tens to thousands of process variables, such as mass flows, vassal holdups, pressures and temperatures of liquids and vapors at different locations of a process, and the like, and may contain from a few to millions of mathematical equations and parameters, depending on the size and complexity of the underlying process. In a general form, a first-principles steady-state model can be described in Equations (1) and (2), as follows:

$$F(U,Y,X,\theta)=0 \qquad (1)$$

Subject to:

$$G(U,Y,X,\theta)\leq 0; \qquad (2)$$

where $U=[u_1\ u_2\ \ldots\ u_r]^T$, $Y=[y_1\ y_2\ \ldots\ y_p]^T$, $X=[x_1\ x_2\ \ldots\ x_n]^T$, $\theta=[\theta_1\ \theta_2\ \ldots\ \theta_m]^T$ In Equations (1) and (2), U comprises the first principles model's input variables, Y comprises output variables, X comprises state variables, and θ comprises model parameters, respectively. The right side of Equation (1) equals zero (i.e., 0), which means that the first-principles model of Equation (1) describes the relations, such as mass balances and energy balances, only at a steady-state (i.e., when all inputs and outputs reached a steady-state balance and no time-dependent dynamic transitions were involved).

Calibration of the first principles model at Equation (1) is performed in the following sub-steps (by the hybrid analyzer 260 as part of method 200, step 210) represented by Equations (3)-(6). First, the hybrid analyzer 260 receives a set of process measurements data of input variables $\overline{U}$ and output variables $\overline{Y}$ at multiple operation points when the process has reached respective steady-states. Second, the hybrid analyzer 260 manually, or using computer routines, tunes model parameters θ in order to minimize the model prediction error as described in reference to Equations (3)-(4) as follows:

$$\min_{\theta \subset \Theta} E(\overline{U}, \overline{Y}, X, \theta) = \min \|\hat{Y} - \overline{Y}\|_2 \qquad (3)$$

Subject to:

$$G(\overline{U}, \hat{Y}, X, \theta) \leq 0; \qquad (4)$$

Note, Equation 4 comprises various process constraints, such as the maximum capacity of an equipment when a flow control valve opened to 100%, high and/or low limits of a process variables' operation, and the like.

After calibration of the first-principles model, all values of model parameters in θ are determined and fixed in Equation (1). The hybrid analyzer 260, then, calculates the specified KPIs based on Equations (1) and (2) from process input variables' values at each steady-state as follows:

$$KPI_S = H(U_S, Y_S, X_S, \theta) \qquad (5)$$

Subject to:

$$G(U_S, Y_S, X_S, \theta) \leq 0; \qquad (6)$$

Note, Equation (5) is a pre-defined process target KPI function, such as a flooding risk factor, column separation efficiency, and the like, depending on the subject process and the root-cause-analysis problem, and in Equation (5) the subscript "s" represents process at a steady-state.

The method continues by the hybrid analyzer 260 training an inferential model at step 220 of FIG. 2A. The inferential model may be a linear model, such as a partial least squares (PLS) model, a piecewise-linear nonlinear PLS model or a preferred nonlinear neural-network (NN) type model (see U.S. Pat. Nos. 7,330,804 and 7,630,868 by Assignee, which are incorporated herein by reference in their entirety). In some embodiments, the hybrid analyzer 260 may select the inferential model from multiple available models for calculating KPIs, and in other embodiments the hybrid analyzer 260 may be provided with a single inferential model for calculating KPIs. The inferential model is trained using the selected measurable process variables as input data, and the KPI's values calculated by the calibrated first principles model (of 210) as output data. Then, the hybrid analyzer in step 230 uses the trained inferential model (of 220) to generate continuous estimations of targeted KPIs by continuously sampling at a consistent sampling rate (e.g., 1 sample per minute) with process variables as inputs.

In some embodiments, training the inferential model comprises the following sub-steps (by the hybrid analyzer 260 as part of method 200, step 220). First, the hybrid analyzer 260 defines a specific input-output inferential model as shown in Equation (7):

$$y = f(u_1, u_2, \ldots, u_r, \theta, t) \qquad (7)$$

where $u_1, u_2, \ldots u_r$ are input variables, θ is a parameter vector, and y is output variable.

Second, the hybrid analyzer 260 collects input and output variables data from process measurements and calculated KPIs. The input variables data may be continuously sampled from process measurements in a format of time-series, while the output variable data may be continuous or non-continuous measurements such as online analyzer measurements, lab samples, or calculated KPIs at different steady-states. Third, the hybrid analyzer 260 selects a model structure, such as a linear PLS, piece-wise-linear model, neural nets (NN) nonlinear model, or a BDN (bounded-derivative-net) model, and the like, depending on the underlying defined problem. Fourth, the hybrid analyzer 260 divides the available dataset into two groups: a training set and a validation set in a percentage (e.g., 70% for training and 30% for validation) in a fixed or random selection. Fifth, the hybrid analyzer 260 fits the model with training set of input and output data, and, then, use the validation dataset to validate the model, so as to minimize the model's prediction error, as shown in Equation 8 as follows:

$$\min_{\theta \subset \Theta} E(\hat{y}, u_1, \ldots u_r, \theta, t) = \min \sum |y(t) - \hat{y}(t)|^2 \qquad (8)$$

As a result, the trained inferential model may be used for KPI output calculation in the Equations (9) and (10) as follows:

$$\hat{y} = f(u_1, u_2, \ldots, u_r, \theta, t) + \text{bias}(t) \qquad (9)$$

$$\text{bias}(t) = (1-\alpha) \times \text{bias}(t-1) + \alpha \times (y(t-1) - \hat{y}(t-1))) \qquad (10)$$

Note Equation (10) is a recursive prediction bias update scheme (described in details later in reference to FIG. 3A), and the bias(t) is an offset to compensate process shifts. Using Equations (9) and (10), the hybrid analyzer 260 calculates continuous KPIs as an output variable of the inferential model offline or online.

The calibrated and trained hybrid analyzer resulting from 210 and 220 is then deployed online to provide effective monitoring and fault detection on those targeted KPIs. Further, in an online running mode, the hybrid analyzer 260 provides a readily self-adaptable framework to re-calibrate the first principles model and update the inferential model for a persistent performance.

Once the hybrid analyzer 260 is running online, in step 240 of FIG. 2A, the first principles model calculates KPIs when the process reaches a steady state. That is, a steady-state detection module of the hybrid analyzer 260 monitors all model inputs, and triggers a calculation of new KPI values whenever the process reaches a new steady-state. The KPI calculations over each pre-specified time period continues until the process steady-state condition is changed and the process is detected to be in a non-steady-state operation phase again. In parallel, once new values of KPI are calculated at steady-state using Equations (5) and (6), and made available to the inferential model from Equation (7), the inferential model dynamically takes those new KPI values as new output measurements. Then, in step 250 of FIG. 2A, the inferential model performs prediction bias updates using Equations (9) and (10) to correct the current dynamic KPI predictions by modifying KPI's offset. This allows the process engineers and operators to readily monitor usually unmeasurable KPIs and KPI related events in the plant based on the output of the hybrid analyzer 260. Further, the hybrid analyzer 260 includes steady-state auto-detection and inferential bias adaptation capabilities, which allows the hybrid analyzer to address the reliability of the process model output over a wide operating range. Together, the first principles model and the inferential model mitigate the disadvantages, and enhance the advantages of each modeling methodology when used alone.

Hybrid Analyzer Configuration

Figure 2B:
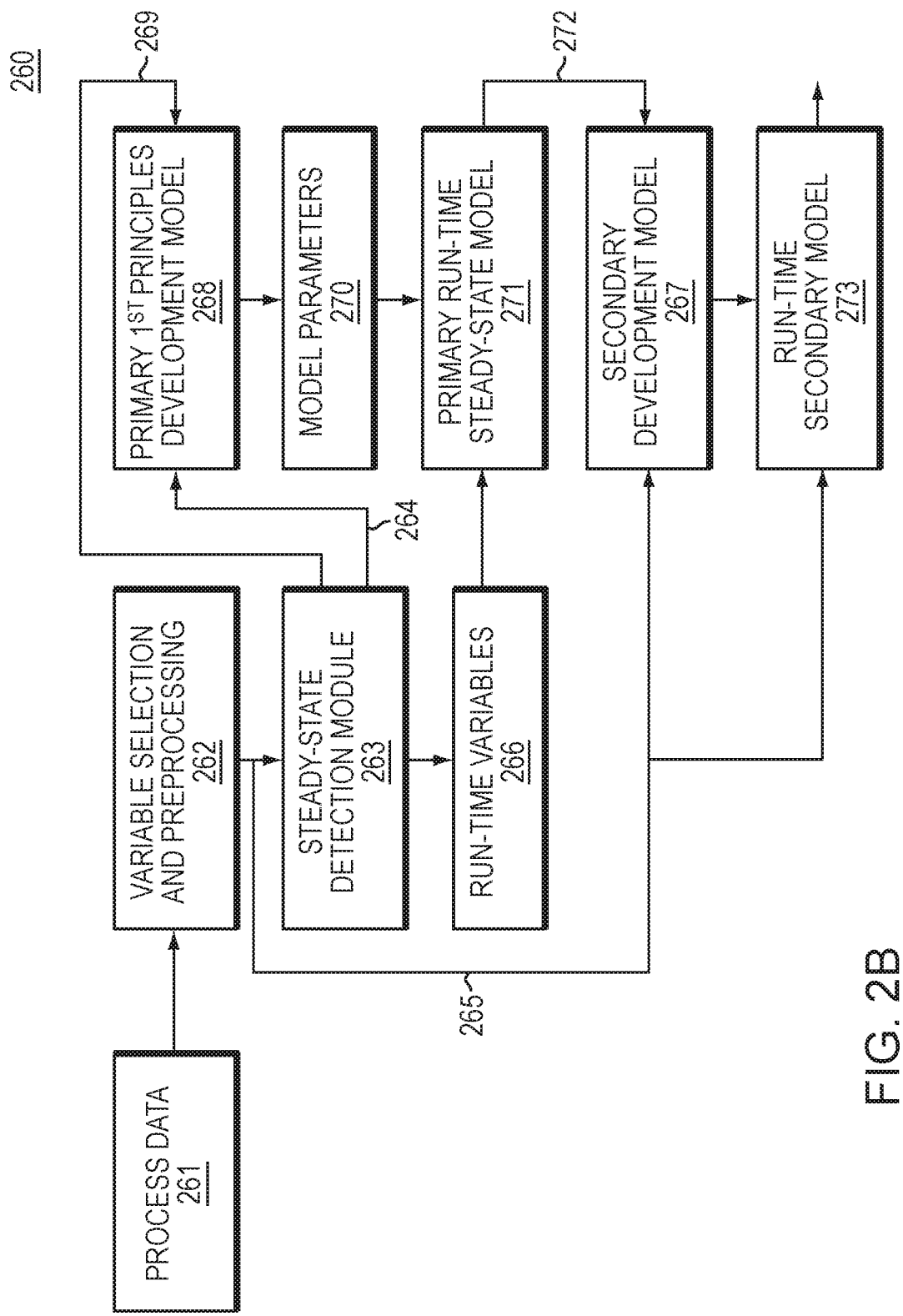
FIG. 2B illustrates a block diagram depicting an example configuration of the hybrid analyzer in FIG. 2A.

FIG. 2B illustrates a block diagram depicting an example configuration of a hybrid analyzer 260, such as the hybrid analyzer described in FIG. 2A. The system computers 101, 102 of FIG. 1 may be configured as a root-cause analyzer including the hybrid analyzer 260. That is, each system computer 101, 102 may be configured according to this example configuration or the example configuration may be distributed across the system computers 101, 102, and 112. Note that the example configuration depicted in FIG. 2B may be implemented as software in some embodiments, as hardware in other embodiments, and as a combination of software and hardware in yet other embodiments.

The first principles development model 268 and the inferential development model 267 may operate in parallel, and may be calibrated and trained using the procedures as follows. As shown in FIG. 1, data for measureable process variables may be collected from various sampling points in an operational plant (e.g., plant sensors 109A-109I, 106, 107 of DCS 104) and stored in the historian database 111. The data server 103 retrieves the collected data for the measurable process variables from the historian database 111, and communicate the collected data to system computer 101 configured as the hybrid analyzer 260 of FIG. 2B. The hybrid analyzer 260 receives the process data 261 from the data server 103, and sends the process data 261 to the variable selection and preprocessing module 262. The variable selection and preprocessing module 262 performs a variable selection process, where some or all of the measurable process variables from plant sensors 109A-109I, 106, 107 are selected. The variable selection and preprocessing module 262 may sample the measurable process variables on a continuous basis, or may sample the measurable process variables at pre-determined time periods based on matching a timestamp corresponding to a steady-state. The measurable process variables may also be suitably screened by a data selection apparatus (see U.S. Pat. No. 9,141,911 B2 (by Assignee), which is hereby incorporated by reference in its entirety). After performing variable selection, the variable selection module 262 stores the measurable process variables' settings in the steady-state detection module 263.

The steady-state detection module 263 sends the stored measurable process variables settings 264, 269 to the first principles development model 268 for calibration. Note, in the embodiment of FIG. 2B, the first principles model is configured as two separate modules, the first principles development model 268 for performing offline calibration functions and the first principles run-time model 271 for performing online functions. In other embodiments, the first principles model may be configured as one module for performing all related functions. During the calibration process, the derived data parameters from the first principles development model 268 are output to the model parameter module 270 for storage. The model parameters module 270 then uses the knowledge gained from the calibrating process to derive run-time model variables from the stored output. The model parameters module 270 provides the run-time model variables to the first principles run-time model 271 for online run-time deployment.

The output 272 of the first principles run-time model 271, together with the output 265 of the variable selection and preprocessing module 262, is provided as training data to the inferential development model 267. Note, in the embodiment of FIG. 2B, the inferential model is configured as two separate modules, the inferential development model 267 for performing offline model training and the inferential run-time model 273 for performing online functions. In other embodiments, the inferential model may be configured as one module for performing all related functions. Also note that the same set of process data 261 is used to calibrate the first principles development model 268 and train the inferential development model 267. The inferential development model 267 uses the training data to derive run-time parameters that may be provided to the run-time model 273 for online run-time deployment.

The output of the trained inferential run-time model 273 is provided to other system computers in the network environment 100 of FIG. 1 as continuous KPIs for performing process operation KPI monitoring and root-cause analysis in the plant. Typically, the data server 103 provides distributed processing units, for interacting with the DCS components 104 and the historian database 111, which provides for data collection and archival storage of plant historical data. Typical data archived by the data repository includes information regarding various process variables, including status, values, operators' event messages, sequences of event data, laboratory data, pre-event and post-event data. Certain archived data may be pre-screened by the variable selection and preprocessing module 262 before being presented to the inferential run-time model 273.

During the ongoing operation of the process, the data stored in the steady-state detection module 263 may be loaded into the run-time variables module 266, which in turn may be loaded into the deployed first principles run-time model 271. Similarly, the data from the model parameters module 270 may be loaded into the deployed first principles run-time model 271. Once the configuration data and parameters have been loaded into the modules 266, 271, the variable selection and preprocessing module 262 receives additional process data 261 from data server 103. The variable selection and preprocessing module 262 performs variable selection on the process data 261 and stores the output data in the steady-state detection module 263. The output data is also loaded as input data variables 265 at the deployed inferential run-time model 273. Note, the internal settings of the first-principles run-time model 271 and the inferential run-time model 273 are stored at the model parameters module 270. The deployed inferential run-time model 273 may also use the loaded input data variables 265 to generate a continuous estimate of KPIs, which are output to the network environment 100. Further, the deployed first-principles run-time model 271 performs steady-state calculations using the loaded data, when the process reaches a steady-state, and provides output of the calculations to the deployed inferential run-time model 273. The deployed inferential run-time model 273 uses the received output calculations to perform the prediction bias updates to correct the calculations of the continuous KPI estimations provided to the network environment 100.

KPI Calculations

Figure 3A:
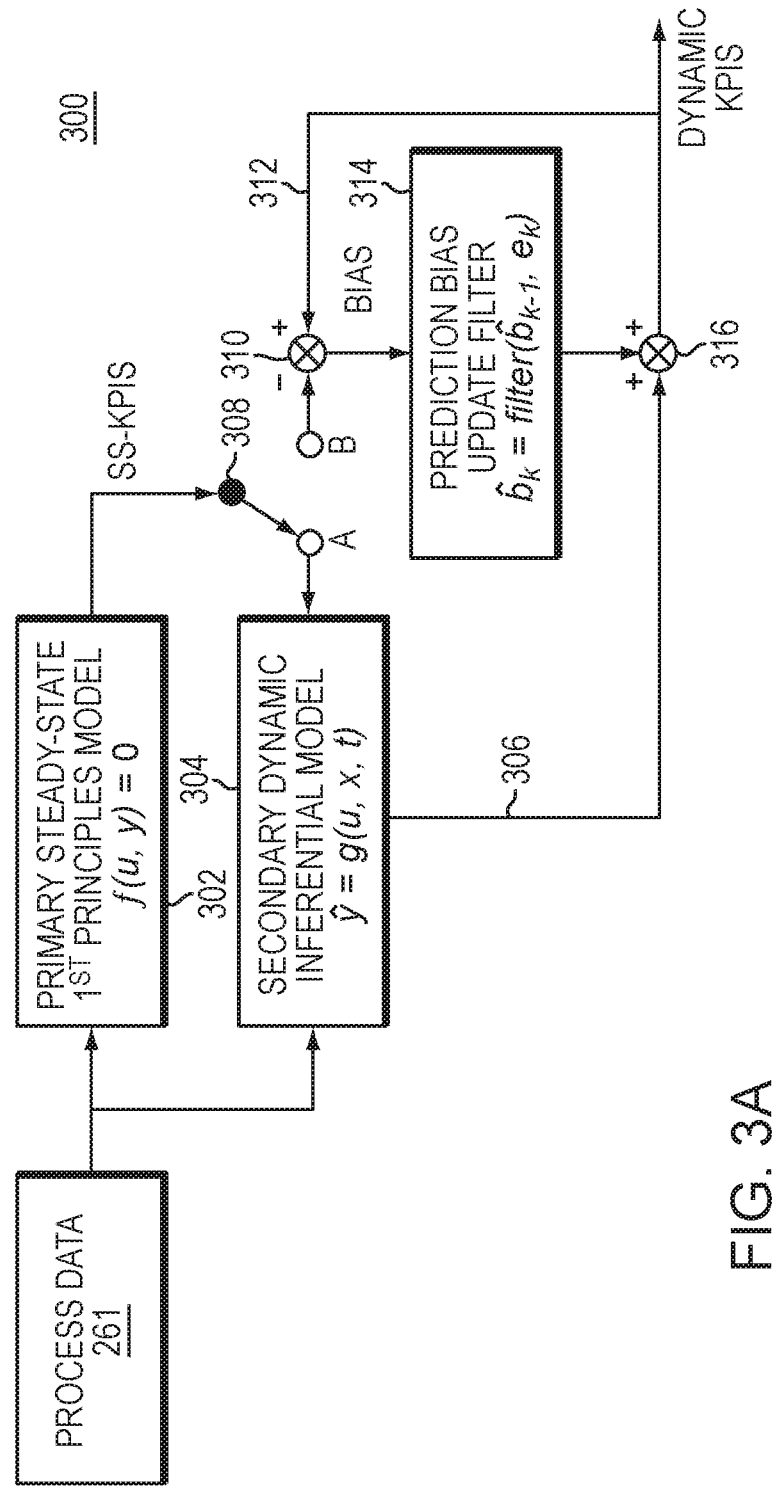
FIG. 3A illustrates a block diagram of another example configuration of a hybrid analyzer calculating KPIs in embodiments of the present invention.

FIG. 3A illustrates a block diagram depicting another configuration 300 of a hybrid analyzer calculating KPIs. In some embodiments, FIG. 3A may illustrate a simplified representation of the hybrid analyzer 260 in FIG. 2B. The hybrid analyzer 300 includes a first principles (steady-state) model 302 and an inferential model 304 connected in parallel. Note, the first principles model 302 comprises both the first principles development model 268 and first principles run-time model 271 of FIG. 2B. Further note, the inferential model 304 comprises both the inferential development model 267 and inferential run-time model 273 of FIG. 2B.

In this example embodiment, the hybrid analyzer 300 is configured to calculate KPIs relevant to undesirable plant events (e.g., distillation column flooding). The undesirable plant event may have occurred in the past or are yet to occur in the future, and the calculated KPIs may be used as indicators of the plant events. In the embodiment of FIG. 3A, the hybrid analyzer 300 has previously calibrated the first principles model 302 and trained the inferential model 304, and both models 302, 304 are in run-time mode. The hybrid analyzer 300 receives process data 261 which is provided to the first principles model 302 and the inferential model 304. In the embodiment of FIG. 3A, the processing of the first principles model 302 output is controlled by the hybrid analyzer using a mode switch module 308. When the switch 308 is at position A (as shown in FIG. 3A), the steady-state KPIs (calculated from Equations (5) and (6)) from the first principles model 302 are provided to the inferential model 304 for use in training inferential model. When the switch 308 is at position B, the inferential model is in run-time mode and generates continuous KPC predictions. Note, the dynamic KPI predictions (calculated by Equations (9) and (10)) are output to a process monitoring environment, such as the environment 100 in FIG. 1, the dynamic KPI predictions are provided as input 306 to adder 316 to be adjusted by a bias using adaptive filter 314.

When the mode switch 308 is in position B, the steady-state KPIs from the first principles model 302 are instead provided to the adder 310. As the inferential model 304 calculates the dynamic KPI predictions, and the KPI predictions are provided as input 306 to adder 316 for bias adjustment, the dynamic KPI predictions after adder 316, are further provided as input 312 to adder 310 as a feedback. At adder 310, the dynamic KPIs biases are calculated with the steady-state KPIs that were also provided to adder 310 (e.g., $e_k=[Dyn\_KPI(t)-SS\_KPI(k)]$) to generate an updated bias for adjusting dynamic KPI predictions. The updated bias is then provided to an adaptive filter 314 for adjusting future KPI predictions to count for measurement offsets. The adaptive filter 314 may be any conventional adaptive filters used in the process industry. The final system output of hybrid analyzer configuration 300 is dynamic KPI predictions that are corrected and filtered to accurately reflect an estimation of the process dynamic KPIs.

Figure 3B:
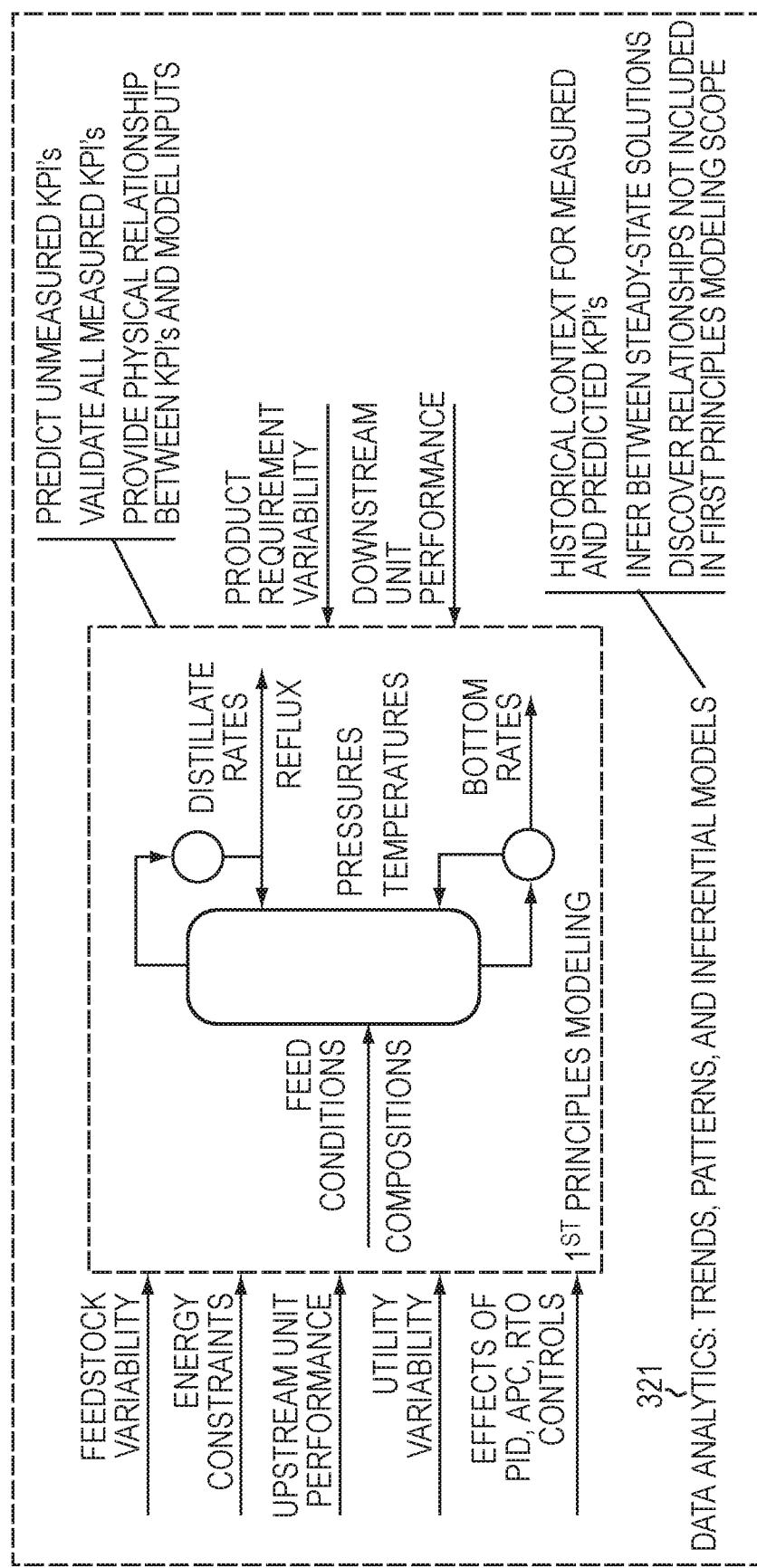
FIG. 3B illustrates a block diagram depicting example concept and functions of the hybrid approach of a first principles model and an inferential model in an example embodiment of the hybrid analyzer in FIG. 3A.

FIG. 3B illustrates a first principles model 302 in an example embodiment of the hybrid analyzer 300 of FIG. 3A. In FIG. 3B, historical data for different process variables (feedstock variability, energy constraints, upstream unit performance, utility variability, effects of PID, APC, and RTO controls, product requirement variability, and downstream unit performance) are loaded into the hybrid model 302, 304 from an historian database. These process variables may be used to calibrate the first principles model 302 shown in FIG. 3B. Once the first principles model is calibrated, the process variables may then be used by the first principles model 302 to predict unmeasured KPIs for a particular event, validate all the measured KPIs for the particular event, and provide physical relationships with the KPIs during steady-states. For example, as shown, the first principles model 302 may be passed feed conditions and compositions input from the process variable measurements into the model, and based on pressures (sensed or detected), temperatures (sensed or detected), calculated bottom rates, calculated distillate rates, and reflux conditions (sensed or detected) of the plant, the first principles model 302 may predict unmeasured KPI values for the particular event during steady-states. FIG. 3B also shows the data analytics (trends, patterns, and inferential models) 321 used by the hybrid model 300 to provide historical context for measured and predicted KPIs for the particular event, estimate KPIs between steady-states, and discover relationships not included in the first principles modeling scope. Together, the first principles modeling and the data analytics allow for the example hybrid model 300 to continuously generate KPIs for the particular event.

Figure 3C:
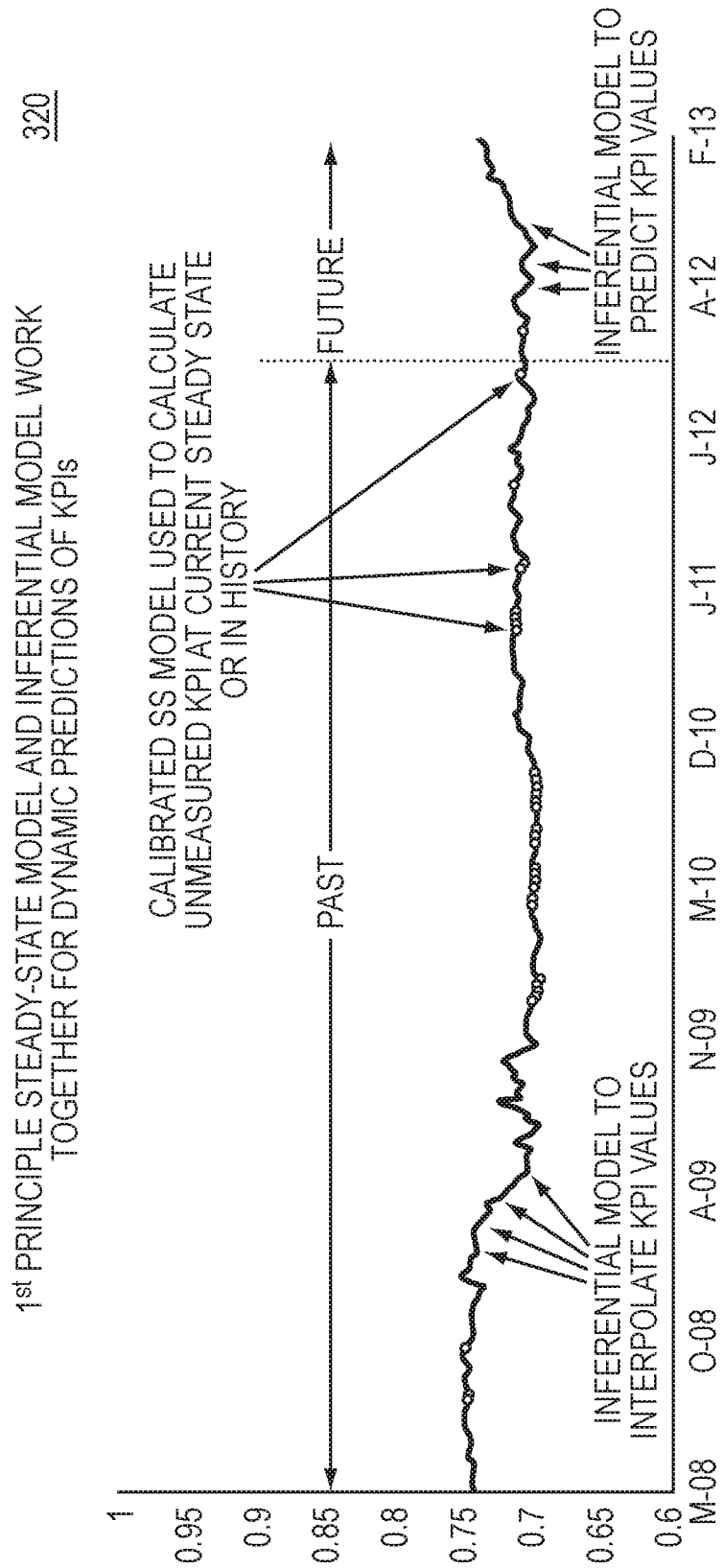
FIG. 3C illustrates a data chart of plots from a first principles model and an inferential model together calculating KPIs according to the present invention.

FIG. 3C illustrates a data chart of exemplary plots 320 from a first principles model 302 and an inferential model 304 that together generated KPIs. The calibrated first principle model 302 (i.e., steady-state model) online calculates steady-state KPI values over the historical data. Data chart 320 shows small circles to represent the calculated KPIs from the calibrated first principle model 302. As shown in FIG. 3C, the first principles model 302 only calculates valid KPI values (i.e., small circles), and provides the valid KPIs to the inferential model 304 for training, when the process is detected to be in a steady-state. In the steady-state period, the inferential model 304 is trained using the valid KPIs represented by the small circles and corresponding measured process variable inputs at these periods. Once the inferential model 304 is trained, the trained inferential model 304, now in run-time mode, is fed continuous operations data as input, and generates continuous KPI estimations (i.e., the continuous curves as shown in FIG. 3C). The calibrated first principle model 302 only calculates current KPIs (i.e., small circles) during periods that the process is in steady-state. As the time moves into the future, the trained inferential model 304 continues to estimate/predict the KPIs, and the calibrated first principle model 302 continues to calculate current KPIs in steady-state, for as long as operations data is fed as input to the calibrated first principle model 302.

Target Signal Precursor Search

Figure 4:
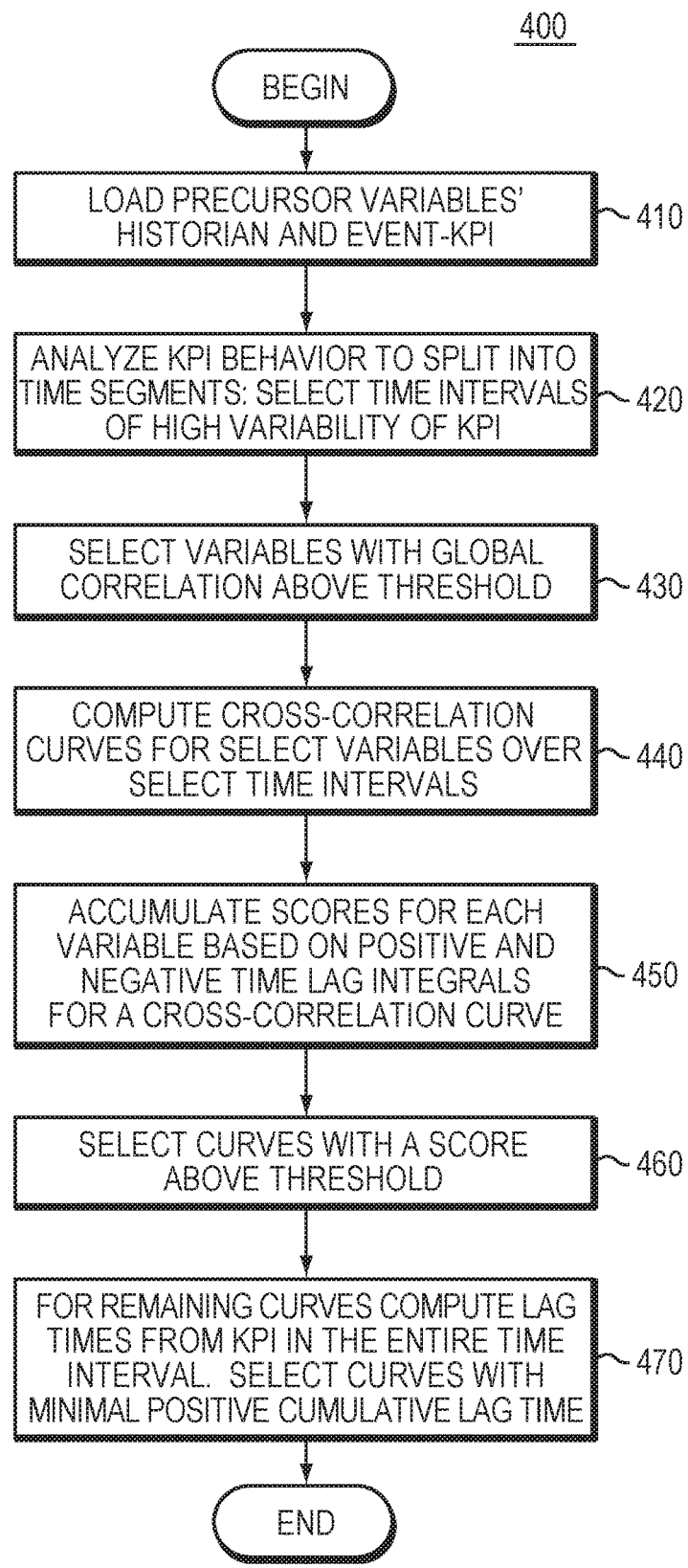
FIG. 4 illustrates a flowchart of an example method for performing a target signal precursor search (TSPS) in embodiments of the present invention.

FIG. 4 illustrates a flowchart of an example method 400 for performing a preliminary target signal precursor search (TSPS) to identify precursor variables of an undesirable plant event. The method 400 may be performed by a search engine that may be configured on system computer 101, 102, along with a hybrid analyzer 260, 300, as part of a root-cause analyzer. Prior to performing this method, the hybrid analyzer may have generated the continuous KPIs in relation to one or more plant events. Note, in this embodiment, the continuous KPIs have been generated using the hybrid analyzer 260, 300 as described in FIGS. 2A, 2B, and 3A-3C, but in other embodiments the continuous KPIs, or other such measurements, may be generated using other models or analyzers. The main challenge in identifying precursors for an undesirable plant event is the thousands of process variables available (i.e., precursor candidates) in the historian database for the plant process. In the method of FIG. 4, the search engine of the root-cause analyzer may use the event-relevant KPIs for facilitating the search of the process variables (by a search engine) to select precursor candidates for the event.

The method 400 begins at step 410 by the search engine loading process variables from a historian database. The search engine loads the process variables as candidate precursors of a particular undesirable plant event. Note that a special data screening and pre-processing method (see U.S. Pat. No. 9,141,911 B2 by Applicant, which is incorporated herein by reference in its entirety) may also be applied to process variable to obtain auto-preprocessed clean data for the precursor search. At step 410, the search engine also loads KPIs calculated by the hybrid analyzer to represent plant events. The search engine may select a subset of the KPIs to indicate the risk level that the particular undesirable plant event has or will occur in the plant process. A KPI may be selected as part of the subset (i.e., an event-relevant KPI) because the KPI highly correlates to the particular undesirable plant event, such as selecting the estimated flooding factor of a distillation column KPI for column flooding events or selecting the column separation efficiency KPI for column fouling events. The search engine may load data for the process variables and KPIs into various formats for analysis. In the embodiment of FIG. 4, the data is plotted in a data chart as time series curves, but in other embodiments, the data may be analyzed in any other graphical or non-graphical formats known in the art.

At step 420, the search engine splits each respective KPI into a time series based on analyzing the behavior of the KPI. That is, the search engine divides the data collected for the KPI over a time period into multiple time intervals or segments (i.e., multiple subsets of time series). The time intervals may be defined by the search engine based on analyzing the collected data to identify large value variations over the time period. Several formulas may be applied for identification of large value variations. First, based on the multiple a of standard deviation $\sigma_{\Delta x}$ of the difference between max and min values over M consecutive data points, Equation (11) may be applied as follows:

$\Delta x_i > a\sigma_{\Delta x}$;

$\Delta x_i = \max(\overline{x}_{i,M}) - \min(\overline{x}_{i,M})$;

$$\overline{x}_{i,M} = [X_i, X_{i+1}, X_{i+2}, \ldots, X_{i+M}] \quad (11)$$

Further, based on the multiple a of standard deviation $\sigma_{\Delta x}$ of the absolute slope value over M consecutive data points and K points for averaging, Equation (12) may be applied as follows:

$\delta x_i > a\sigma_{\delta x}$;

$\delta x_i = \mathrm{mean}(\overline{x}_{i,K}) - \mathrm{mean}(\overline{x}_{i+M-K,K})$;

$\overline{x}_{i,K} = [X_i, X_{i+1}, \ldots, X_{i+K}]$ $$\overline{x}_{i+M-K,K} = [X_{i+M-K}, X_{i+M-K+1}, \ldots, X_{i+M}] \quad (12)$$

The time intervals may also be defined by the search engine based on analyzing the collected data to identify KPI values at different operating levels of the process. In some embodiments, such as the embodiment in FIG. 4, the search engine may select time intervals having the highest variability from the time series for identifying candidate precursors for the undesirable plant event. In other embodiments, the search engine may select time intervals based on additional or different criteria. During step 420, intervals in the time series with oscillations around steady-state are ignored, but the search engine may use these intervals for the calculation of cumulative scores for positive and negative lags later in the method 400.

Using the selected time intervals, at step 430, the search engine performs an initial elimination of process variables as part of the search process of potential precursors of the undesirable process behavior. The initial elimination removes process variables with poor overall correlations to the KPI, by the search engine only selecting process variable with global correlation above a specific threshold at the selected time intervals. For example, the initial elimination can be performed with a coarse requirement for global correlation to be larger than 0.7. This elimination may involve the search engine analyzing the subset time series to estimate the cross-correlations between the process variables and the KPI for the selected time intervals, and discarding variables with almost no correlations to the KPI. Cross-correlation is defined in a standard way as: $\rho_{X,i,M,\tau} = E[(\overline{x}_{i,M} - \mathrm{mean}(\overline{x}_{i,M}))(\overline{x}_{i,M} - \mathrm{mean}(\overline{x}_{i+\tau,M}))]/\sigma_{\overline{x}_{i,M}}\sigma_{\overline{x}_{i+\tau,M}}$, where expression for $\overline{x}_{i,K}$ is defined in reference to Equations (11) and (12). The selected process variables (i.e., variables remaining after the elimination) are candidate precursors for the undesirable plant events represented by the event-relevant KPI.

At step 440, the search engine then computes cross-correlation curves for the selected process variables over the selected time intervals. Specifically, consider a set of selected indices $\overline{I} = [I_\xi, I_{\xi+1}, \ldots]$ that define areas of large value variations. A standard cross-correlation function versus time lag r may be calculated for the correlation analysis of each selected variable and KPI at each selected time interval defined by starting index $I_\xi$ and length M. The calculation may include a constant time shift which is scaled based on the temporal resolution of the time series. Then, the search engine calculates a cross-correlation score for each cross correlation curve by evaluating the positive and negative integral of the respective cross correlation curve. At step 450, the search engine computes the accumulated cross-correlation scores $$s = \sum_{\xi,\tau} \rho_{X,I_\xi,M,\tau}$$

for each selected variable over the selected time intervals. The search engine computes the accumulated scores for a selected variable by determining the positive lag time $\tau > 0$ and negative lag time $\tau < 0$ intervals from each cross-correlation curve for the respective selected process variable X over all selected time intervals $\overline{I} = [I_\xi, I_{\xi+1}, \ldots]$. Note, the shape of a cross-correlation curve may be highly irregular for realistic KPI time series, thus, the search engine may use an integral measure to adjust the positive and negative time lags. Two integrals are computed: over positive lags and negative lags. For each semi-infinite domains and approximation is made to limit the range of integration to the largest value of time lag. Then the integral is $$S = \sum_{\xi,\tau} \tau \rho_{X,I_\xi,M,\tau} \approx \sum_\xi \int_0^{\tau_{max}} \rho_{X,I_\xi,M,\tau} d\tau.$$

At step 460, the search engine selects curves for all process variables with an accumulated score above a configured threshold, thereby eliminating all process variables as candidate precursors with scores below the configured threshold. This selection results in a dramatic reduction of the number of available candidates for precursors.

For each remaining process variable, at step 470, the search engine computes rolling lag time over the entire historical span of the time intervals for the respective process variable. The search engine applies the rolling lag time computation $$S(t; L) = \sum_\tau \tau \rho_{X,t,L,\tau}$$

to each selected process variable curve, which includes applying a series of cross-correlation curve constructions using a constant window width L, starting from the past $t=I_0$ and moving toward the future. The search engine performs the computations using the entire range of historical data for a KPI, and for each cross-correlation curve, the search engine extracts the lag time based on the maximum time indicated by the curve. The search engine sorts the process variables according to minimal cumulative lag time (i.e., highest negative lags to the event-relevant KPI) as computed across the entire historical span. The search engine selects the curves for the top sorted process variables to continue as precursor variable candidates, and the curves for the other remaining precursor variable candidates are eliminated. In some embodiments, a user may configure a subrange of the historical span, instead of the entire historical span, to be used for computing cumulative lag time. Further, if a first precursor variable candidate shows strong correlation to a second precursor variable candidate, and the second precursor variable candidate has a higher cross-correlation score, then the search engine may eliminate the first precursor variable candidate to prevent multi-collinearity effects. Method 400 of FIG. 4 may be completed with the one or more precursor variable candidates selected from the process variables initially loaded from the historian database.

Note that FIG. 4 shows a sequence of steps with the increasing cost of calculations. For example, step 430 requires less computational efforts per variable than step 450, and step 450, in turn, requires less computational efforts per variable than step 470. Thus, an essential part of method 400 is early and consistent elimination of variables from the list of potential precursors. This reduces a large of amount of computation costs, makes the target signal precursor search analysis practical for industrial applications.

Causality Analysis

Figure 5A:
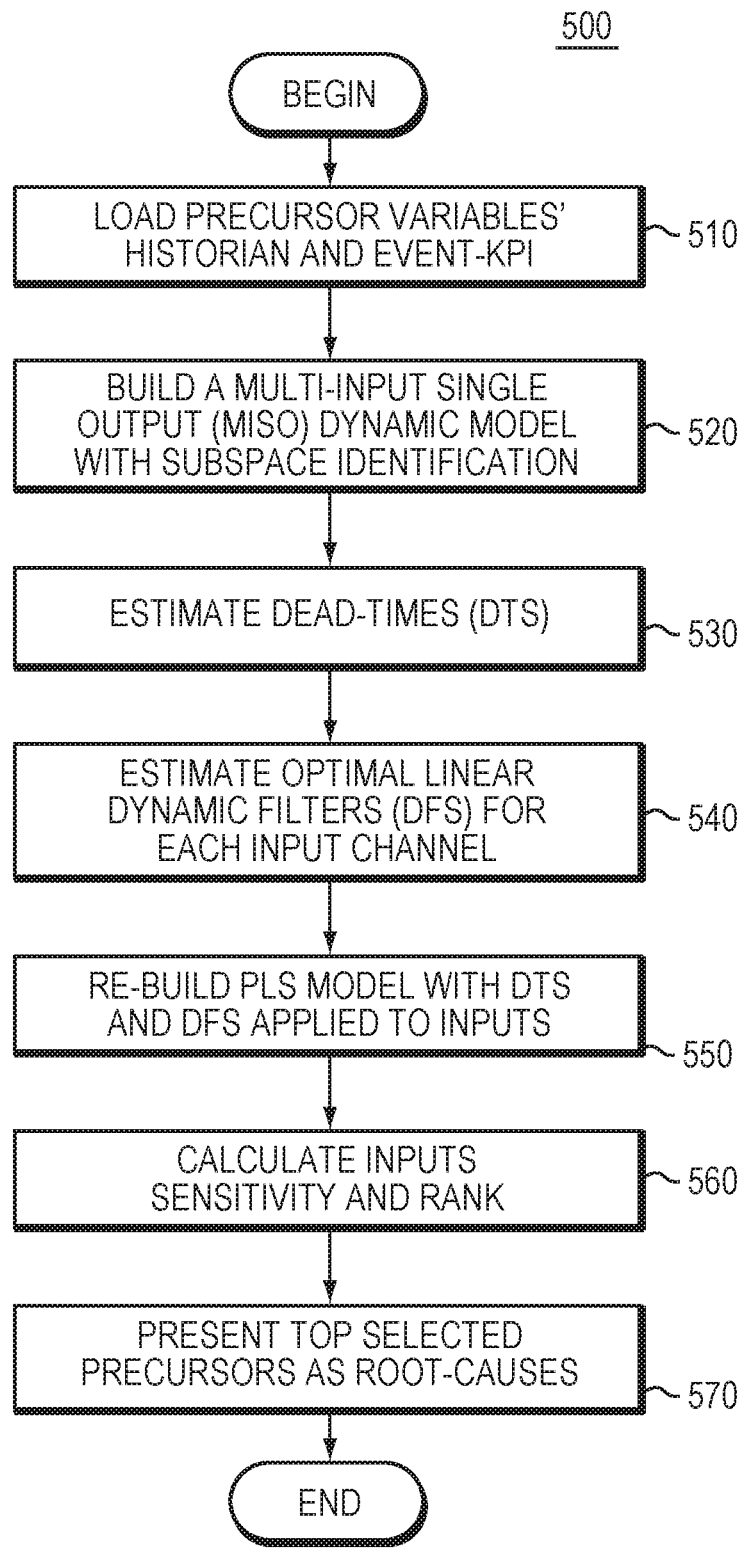
FIG. 5A illustrates a flowchart of an example method for performing a causality analysis (CA) in embodiments of the present invention.

FIG. 5A illustrates a flowchart of an example method 500 for performing a causality analysis. The method 500 may be performed by a parametric analyzer that may be configured on system computer 101, 102, along with a search engine and hybrid analyzer 260, 300, as part of a root-cause analyzer. The method 500 begins at step 510 by the parametric analyzer loading process variables data from a historian database as measurements of potential precursor variable candidates of a particular undesirable plant event. At step 510, the parametric analyzer 500 also loads KPIs that highly correlate to the particular undesirable plant event and calculated by the hybrid analyzer 260 (hybrid model) using Equations (5), (6), (9), and (10). The parametric analyzer 500 may perform similar steps for method 500 (step 510) as described for the target signal precursor search method 400 of FIG. 4 for initially identifying precursor candidates for the undesirable plant event based on the loaded KPIs. In some embodiments, the parametric analyzer 500 may perform additional or different steps to identify precursor candidates from the loaded process variables, including allowing the user to select specific process variables as precursor candidates.

At step 520 of FIG. 5A, the parametric analyzer 500 then builds a multiple-input single-output (MISO) dynamic parametric model between the precursor variable candidates and the event-relevant KPIs for performing quantitative analysis of the precursor variable candidates. The MISO model allows for a more granular investigation of the impact of the precursor variable candidates on the undesirable plant event. The precursor variable candidates may be used as model input and the event-relevant KPIs may be used as model output for the MISO model. In the embodiment of FIG. 5A, the parametric analyzer 500 first builds a MISO model with subspace identification. Subspace identification is an algorithm to identify dynamic process models from input and output measurements and the algorithm used in this invention is performed as the following two sub-steps (by the parametric analyzer 500 as part of step 520). First, the parametric analyzer 500 defines (assumes) a causal relationship between the precursor variable candidates and the target KPI as a linear multi-input single-output (MISO) dynamic state space model as shown in Equations (13) and (14) as follows:

$$X_n(t+1) = AX_n(t) + Bu(t) \quad (13)$$

$$y(t) = CX_n(t) + Du(t) \quad (14)$$

Next, the parametric analyzer 500 assembles the input and output data into a special subspace projection format and applies a closed-loop subspace identification algorithm (see, e.g., Zhao, H., et al., "*Improved Closed Loop Subspace Identification Technology For Adaptive Modeling and APC Sustained Value*", AIChE Spring Meeting, 2012; and Qin, S. Joe, "*An overview of subspace identification*", Computers and Chemical Engineering, vol. 30, pages 1502-1513 (2006), which are both incorporated herein by reference in their entirety) to solve the problem by Equation (15) as follows:

$$\min J(\{u(t), y(t), X_n(t)\}, \theta) = \min \|y(t) - \hat{y}(t)\|_2 \quad (15)$$

subject to $$X_n(t+1) = AX_n(t) + Bu(t)$$

$$y(t) = CX_n(t) + Du(t)$$

Note, the parametric analyzer may analyze the basic x-y linear relationship between the precursor variable candidates as input and the event-relevant KPIs as output prior to building the MISO model, for example, as a simple x-y scatter plot between an input and KPI output will be able to show the linearity and deviation. If the parametric analyzer 500 detects a significant high-nonlinearity between individual precursor variable candidates based on this analysis, then the parametric analyzer may apply a non-linear transform or piecewise linear transform to individual precursor variable candidates prior to using the variables as input to the MISO model, for example, a logarithm transform or piecewise linear transform on the input can correct many nonlinearities.

Next, the parametric analyzer 500 may factor each sub-model of the MISO model into accurate dead-times and dynamic linear filters. The model is factored into accurate dead-times and dynamic filters to describe the causal relationship between each precursor candidate and event-relevant KPI. At step 530, the parametric analyzer calculates estimates of the dead-times between the precursor candidates and event-relevant KPIs. At step 530, the parametric analyzer may calculate the estimates of the dead-times for each input channel of a precursor candidate as input to a respective sub-model of the MISO model. Further, in some embodiments, the parametric analyzer may estimate dead-time for each input channel of a precursor variable candidate using an optimization search based on the sub-model of the i-th input to the corresponding event-relevant KPI. For example, the dead-time search can be resolve in the problem defined in Equations (16) and (17) as follows, where $DT_i$ is the ith input channel dead-time, $y(t)$ and $\hat{y}(t)$ is the step response of the single-input single output (SISO) sub-model of (17) and an approximation of the response.

$$\min_{DT_i} J(\{u_i(t), y(t)\}, \theta) = \min_{DT_i} \|y(t) - \hat{y}(t)\|_2 \quad (16)$$

subject to (17)
$$X_n(t+1) = AX_n(t) + Bu_i(t - DT_i)$$
$$y(t) = CX_n(t)$$

At step 540, the parametric analyzer calculates the estimates of optimal linear dynamic filters for each input channel of a precursor variable candidate as model input to the MISO model. Further, in some embodiments, at step 540, the parametric analyzer further estimates the optimal linear dynamic filters of each input channel for a precursor variable candidate using a linear model reduction technique to determine the optimal low-order model fitting. For example, after dead-time is identified in Equations (16) and (17), Equation (17) is then further reduced into a lower order model, such as first-order or second-order filter by using standard model reduction algorithm (Benner, Peter; Fassbender, Heike (2014), "*Model Order Reduction: Techniques and Tools*", Encyclopedia of Systems and Control, Springer, doi:10.1007/978-1-4471-5102-9_142-1, ISBN 978-1-4471-5102-9, which is incorporated herein by reference in its entirety). The parametric analyzer 500 further factors each MISO sub-model into a series of connected dead-time units, and in turn a single-input single-output (SISO) state space dynamic sub-model, in which the parametric analyzer 500 approximates the model dynamics by a low-order dynamic filter defined and calculated for each SISO sub-model, the model structure is shown in FIG. 5B.

At step 550 of method 500, the parametric analyzer rebuilds a new parametric linear MISO as a PLS model by applying the estimated dead-times and dynamic linear filters at each individual input channel of each precursor variable candidate. The parametric analyzer may apply a non-linear transform or piecewise linear transform to individual precursor variable candidates prior to using the variables as input to the rebuilt MISO PLS model. At step 560, the parametric analyzer 500 uses the MISO PLS model to perform PLS regression and sensitivity techniques (see, e.g., Garthwaite, Paul H., "*An Interpretation of Partial Least Squares*," Journal of the American Statistical Association vol. 89 (425), pages 122-127 (1994), which is incorporated herein by reference in its entirety) for calculating a score for the strength of correlation with the event-relevant KPIs, including a relative sensitivity, contribution, and lead-time for each precursor variable candidate. Then, the parametric analyzer 500 selects root-cause variables from the precursor candidates with the highest strength of sensitivity score. The parametric analyzer 500 may select the root-cause variable using fuzzy logic rules which combine the scores for top ranked precursor variable candidates to determine the most appropriate of the variables for early risk indication and event prevention action advising. At step 570, the parametric analyzer presents (outputs) the selected root-cause variables to process engineers and operators who may confirm or reject the variables as the root-cause of the respective undesirable plant event based on their process knowledge and experience.

Figure 5B:
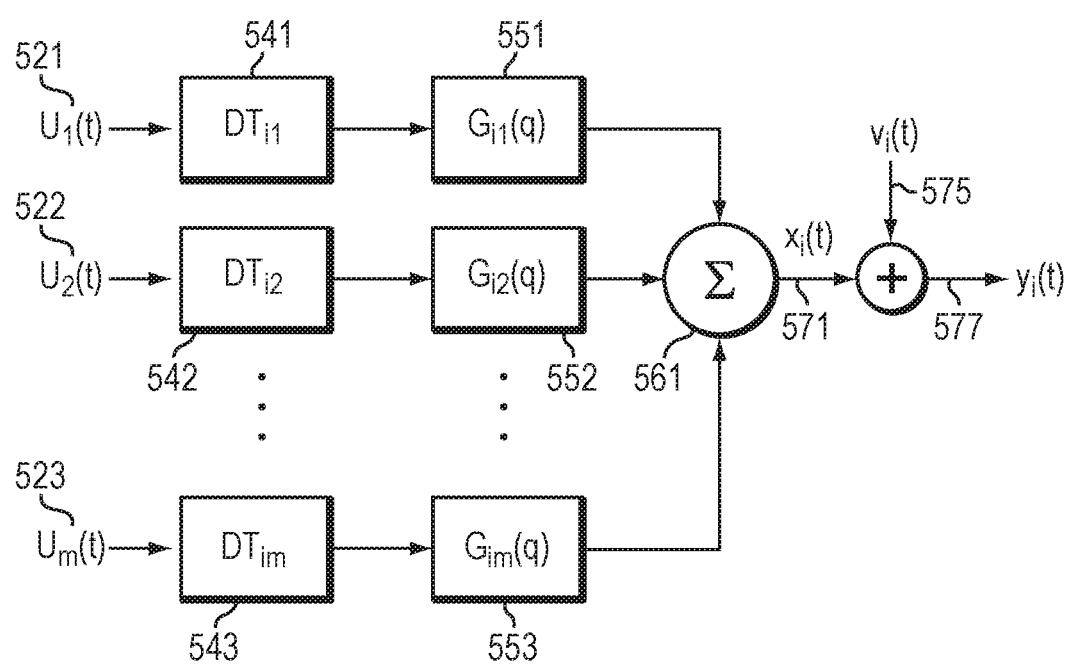
FIG. 5B illustrates a block diagram depicting an example multiple input single output (MISO) model used in some embodiments of FIG. 5A.

FIG. 5B illustrates a block diagram depicting an example (MISO) model 580 used in some embodiments of FIG. 5A (e.g., at step 520 and 550 of parametric analyzer 500). The MISO model 580 is shown as a summation of multiple single-input single-output (SISO) dynamic sub-models, but in other embodiments the MISO model may be organized in various other sub-model configurations. The precursor variable candidates are provided as input 521, 522, 523 to the input channel for each respective sub-model of the MISO model and the event-relevant KPIs is provided as output 577 of the MISO model. The input 521, 522, 523 are provided to dead-time units 541, 542, 543 of the respective sub-model for calculating dead-time estimates for the precursor variable candidates based on the corresponding event-relevant KPIs. The dead-time estimates are then part of the model parameters from the dead-time units 541, 542, 543. The input 521, 522, 523 go through the dead-time units 541, 542, 543 with corresponding time delays, then input to low-order dynamic filters 551, 552, 553 to estimate the optimal linear filter for the precursor variable candidates. The optimal linear filter estimates are then part of the model parameters from low-order dynamic filters 551, 552, 553. The outputs from optimal linear filters are then summed 561 with a weighting vector that is a partial-least squares (PLS) model fitted with the inputs and output KPI data for the precursor variable candidates, which provides a relative sensitivity and contribution ranking score for each precursor variable candidate. Then fuzzy logic rules are applied to combine the scores for top ranked precursor variable candidates to select root-cause variables. The selected root cause variables provided to process engineers and operators to confirm or reject the variables as the root-cause of the respective undesirable plant event. In some embodiments, the control system, such as the DCS or other plant or refinery control system, may automatically confirm or reject the variables as the root cause and programs the control system to take actions (e.g., monitor, alarm, update plant variables, and such) based on the confirmed root cause variables. For example, output representing implications of the root-cause precursor variables may be transmitted to a plant control system for diagnosing a root-cause of the event Using this output information 577 as a signature, plant operations may be diagnosed and root causes detected. In turn, the process engineers and operators (or plant control systems) may quickly narrow the results of the root-cause search of the undesirable plant event, and determine whether each root-cause variable candidates is the cause of an operation problem based on their knowledge of the process. Further, the process engineers and operators, or the control system (e.g., DCS), may also use this information to better understand unexpected events, to be more focused on particular process variables as precursors, and to take early actions if necessary based on KPIs' monitoring and alarming. As a result, the root-cause-analysis lowers the risks of reoccurrence of the events, and as such, prevents the undesirable events from future operations. In this way, embodiments of the present invention provide process engineers and operators (along with programmed plant control and processing systems) with a new and highly efficient tool for event causality analysis in various applications of process industry, including but not limited to undesirable events root-cause analysis, operational trouble-shooting, process faults detection and identification, as well as plant risk management.

Example Root Cause Analysis

Figure 6A:
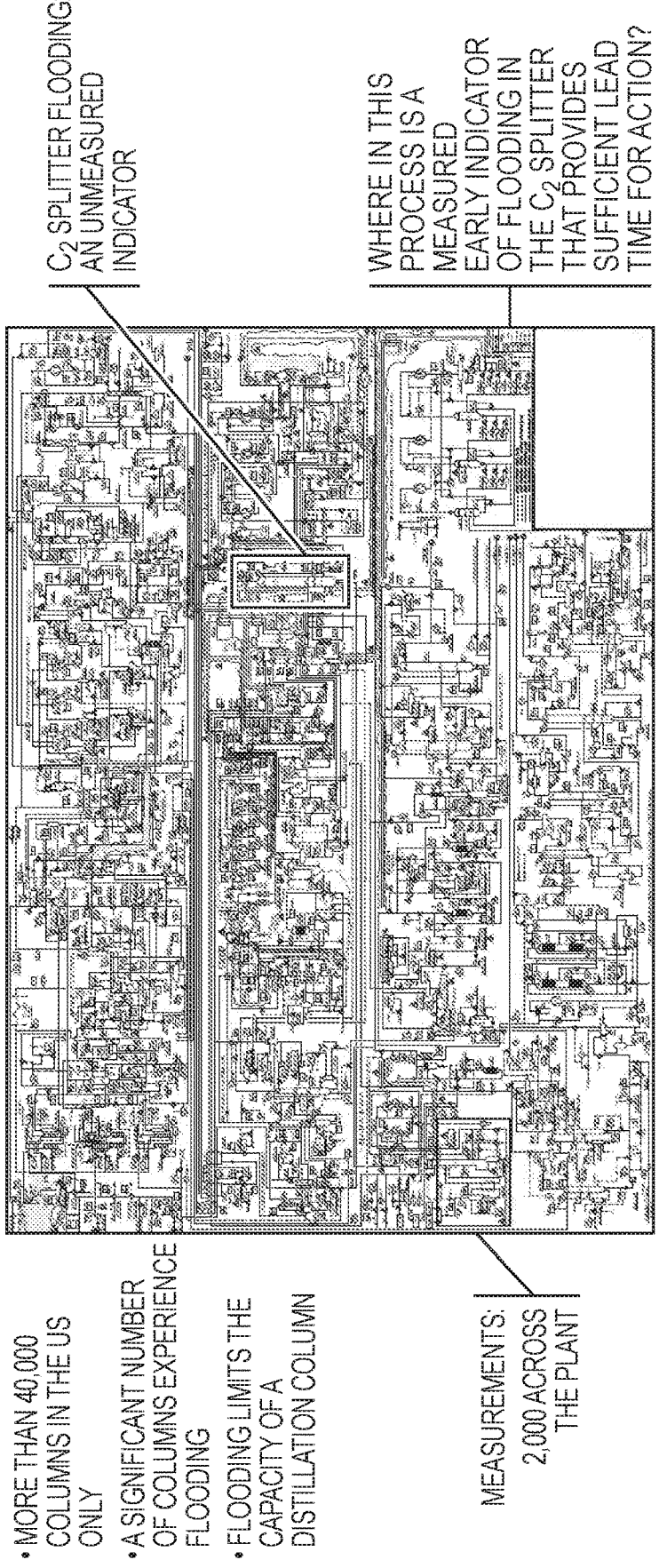

FIGS. 6A-6I illustrate performing root cause analysis of flooding in a C2 splitter, a distillation column of the ethylene manufacturing process, using the methods 200, 400, 500, 580 of FIGS. 2A, 4, and 5A-5B. As shown in FIG. 6A, there are more than forty thousand C2 splitter distillation columns in the U.S. alone, and a significant number of these distillation columns experience flooding. The flooding of a distillation column limits the capacity of the column, and may result in an unwanted plant shutdown. However, performing root-cause-analysis on C2 splitter flooding using the numerous process variable measurements across the plant, such as the 2,000 process variable measurements potentially related to the C2 splitter flooding in FIG. 6A, presents a challenge for process engineers and operators. To address this issue, the present invention determines one or more previously unmeasured indicators for identifying particular process variables for root cause analysis of the C2 splitter flooding. In this way, embodiments of the present invention provide an analyzer for C2 splitter distillation columns and the like.

Figure 6B:
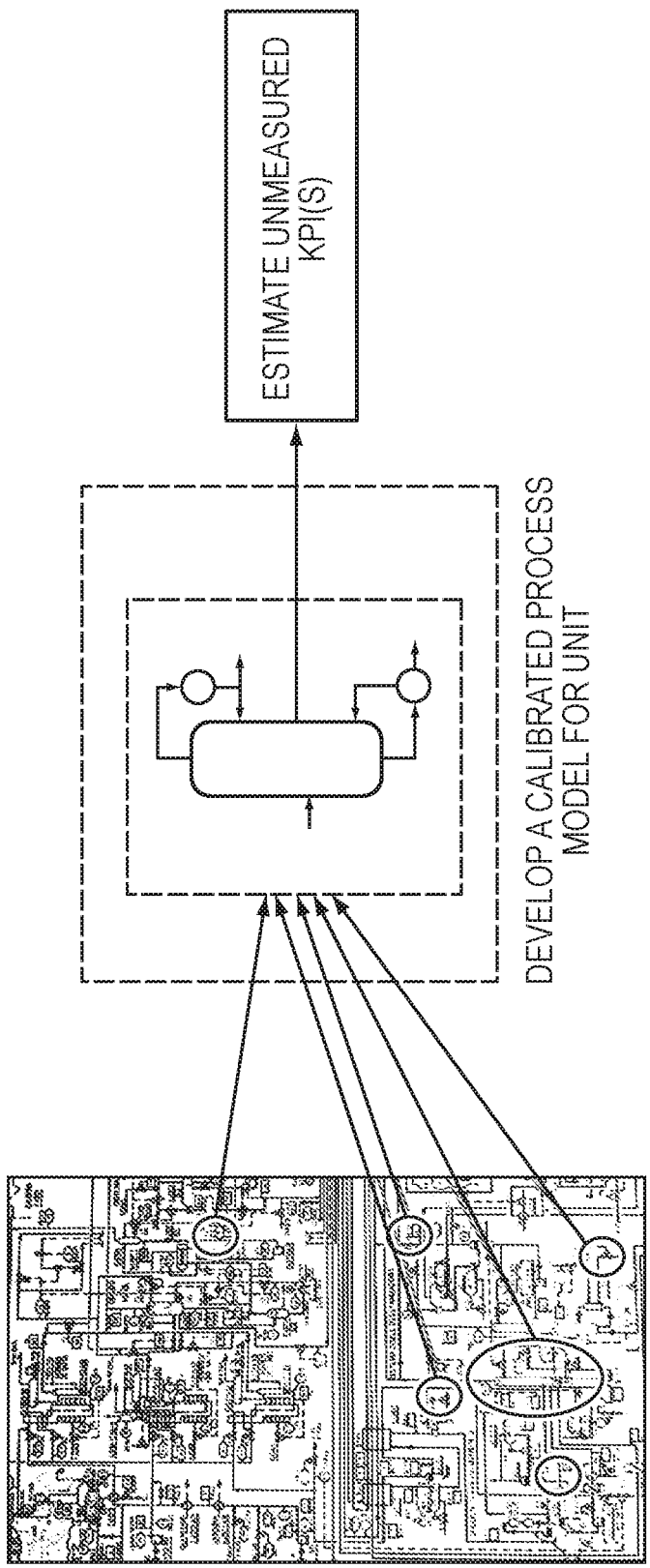
Figure 6D:
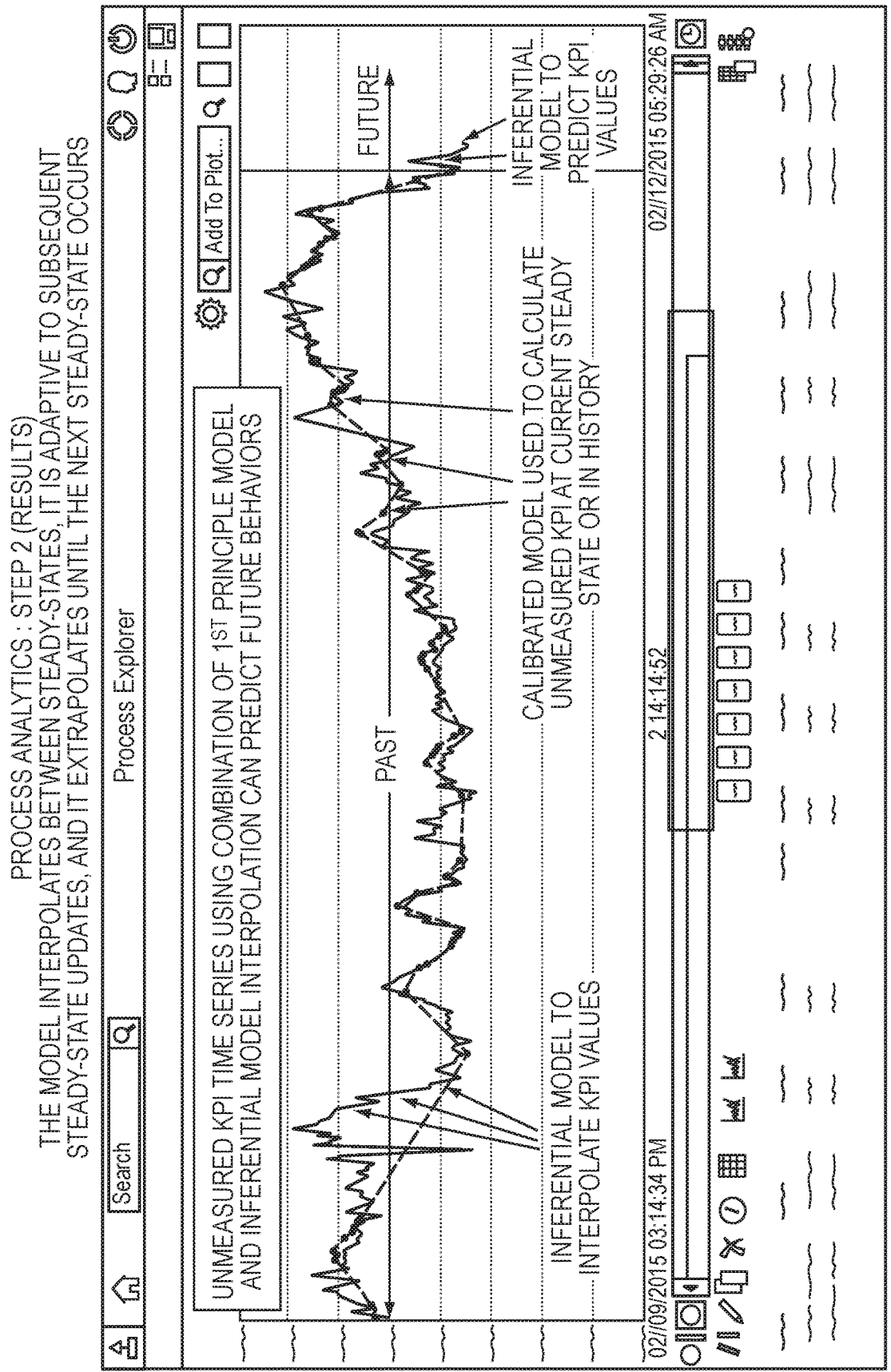

FIGS. 6B-6D illustrate the generation of continuous KPIs for use as the indicators of C2 splitter flooding for performing root-cause-analysis. FIGS. 6B-6D may generate the continuous KPIs in accordance with example method 200 of FIG. 2A. FIG. 6B illustrates the first step in generating the continuous KPIs using a first principles model. The step of FIG. 6B collects historical process variable measurements relevant to C2 splitter flooding for developing a calibrated process model (i.e., a first principles model). The first principles model then estimates C2 splitter flooding relevant KPI values periodically when the plant is at a steady-state. FIG. 6C illustrates the second step in generating the continuous KPIs using an inferential model. The step of FIG. 6C uses raw and derived process variable measurements for building a trained inferential model. The trained inferential model then estimates C2 splitter flooding relevant KPI values continuously between steady-state regimes. As shown in FIG. 6D, the first principles model and inferential model are used together over a time series as a hybrid model to generate continuous KPIs for predicting C2 splitter flooding behavior. The calibrated first principles model is used by the hybrid analyzer 260, 300 to calculate the KPI values at steady-state over the time period, and the hybrid analyzer 260, 300 uses the inferential model to interpolate the KPI values between the steady-state calculated values. The hybrid model is adaptive to subsequent steady-state updates and extrapolates until the next steady state KPI values occur. The hybrid model predicts future C2 splitter behavior by predicting future KPI values using the combined first principles model calculated KPI values at steady state and the inferential model interpolated KPI values.

Figure 6E:
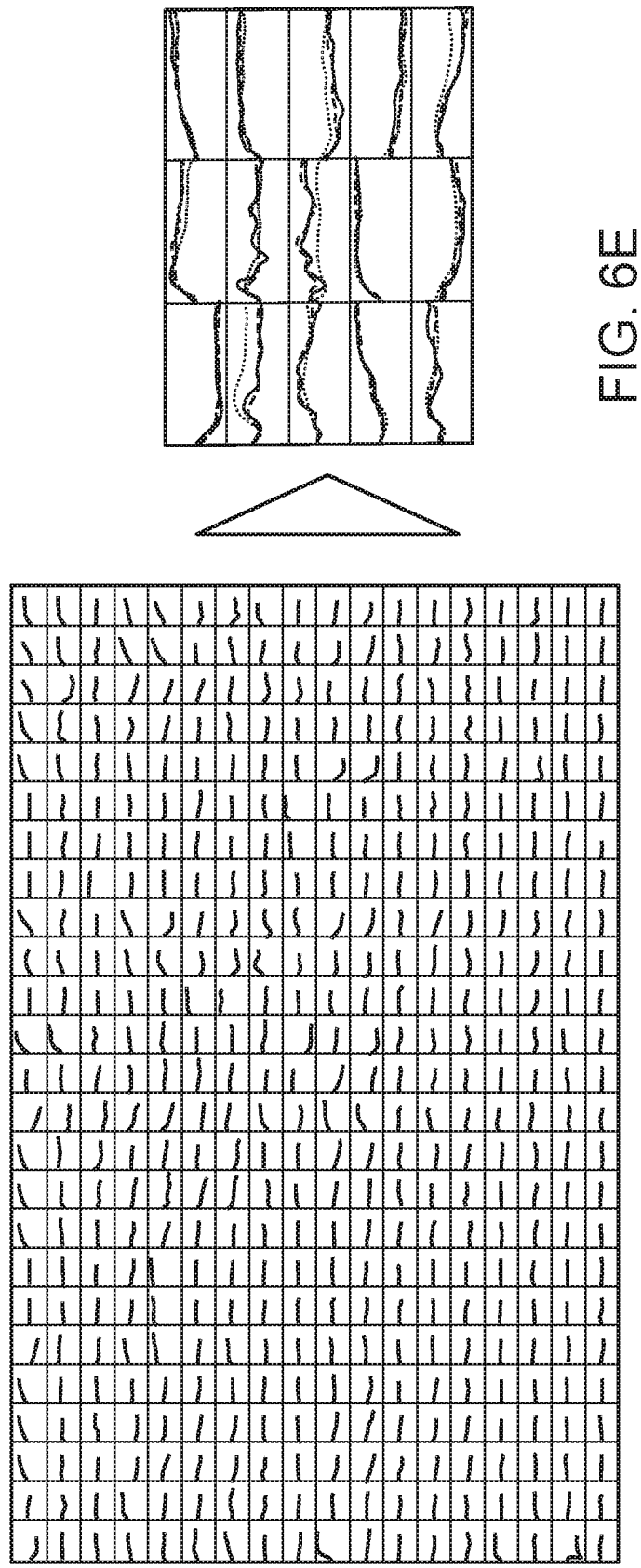
Figure 6F:
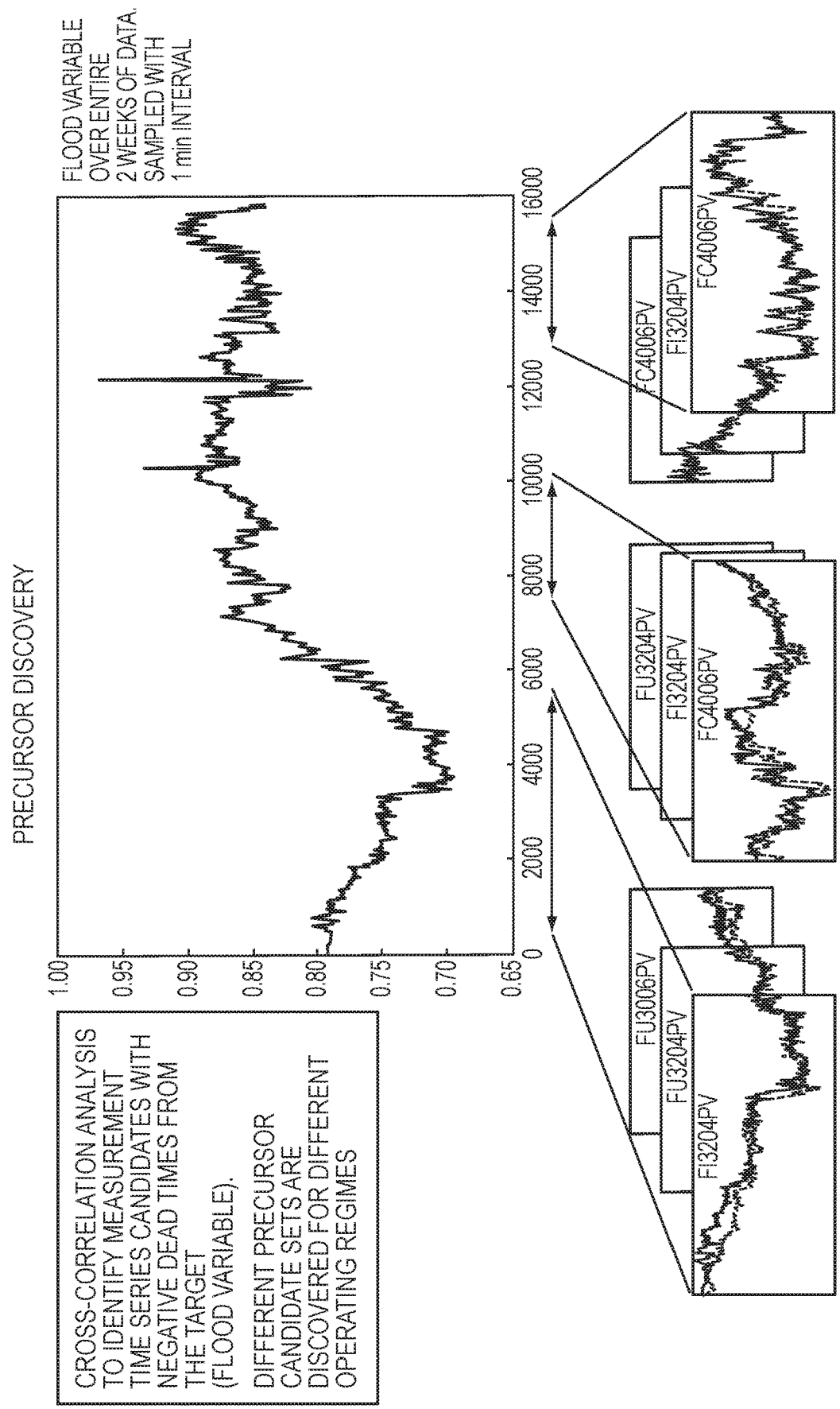
Figure 6G:
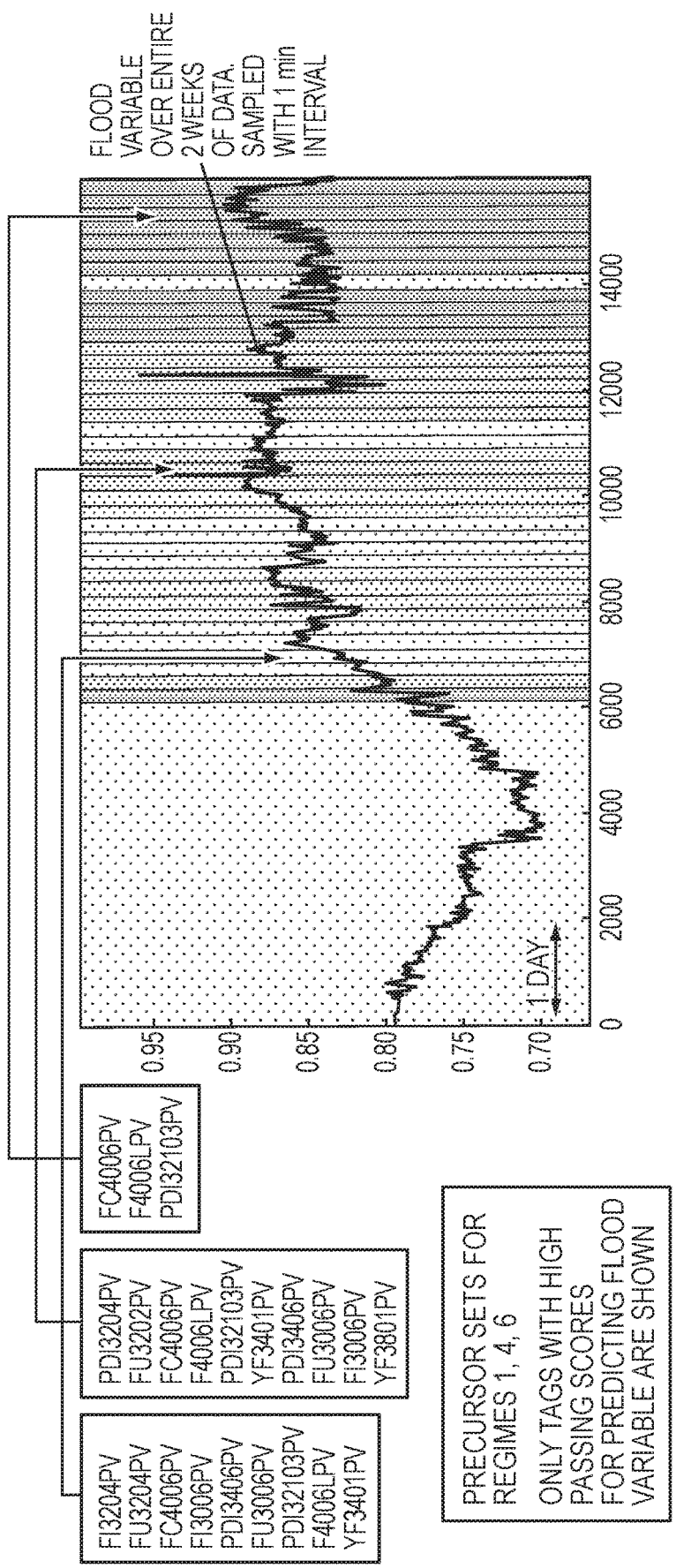

FIGS. 6E-6G illustrate the use of the continuously generated KPIs relevant to C2 splitter flooding to select precursors from the 2,000 process variable measurements that may serve as early alerts to C2 splitter flooding events. The analysis of the C2 splitter flooding using the continuously generated KPIs as shown in FIGS. 6E-6G is performed in accordance with example method 400 of FIG. 4. As shown in FIG. 6E, a sample case study using this analysis reduced the scope of the 2,000 process variables potentially relevant to a C2 splitter flooding event to 20 process variables to be considered as precursor candidates for the event. Specifically, FIG. 6F illustrates the precursor discovery component that performs a target signal precursor search to reduce the scope of the process variables to 20 precursor candidates. In FIG. 6F, the C2 splitter flooding relevant KPIs are split as a time series by dividing the process variable measurements collected for the KPI over a two week time period (sampled at 1 minute intervals). The time series are then used to perform cross-correlation analysis of the process variable measurements in accordance with the steps of the example method 400 of FIG. 4. The cross-correlation analysis in FIG. 6F identifies measurement time series with negative dead times from a target KPI to indicate the precursor candidates (flood variables) based on calculated cross-correlation scores for the process variables. Note, as shown, different precursor candidate sets may be discovered for different operating regimes.

FIG. 6G illustrates the operating regime discovery process for identifying precursor sets for different operating regimes. In FIG. 6G, time series sliding windows, along with an unsupervised learning algorithm, are used to identify clusters of precursor sets for sample operating regimes 1, 4, and 6 as shown. Only process variables determined as having high correlation scores for predicting flood variables in the cross-correlation analysis shown in FIG. 6F are used identify the clusters of precursor sets in FIG. 6G. The precursor discovery processes then further reduce the number of process variables from the precursor sets shown to 20 remaining precursor candidates that highly correlate to C2 splitter flooding.

Figure 6H:
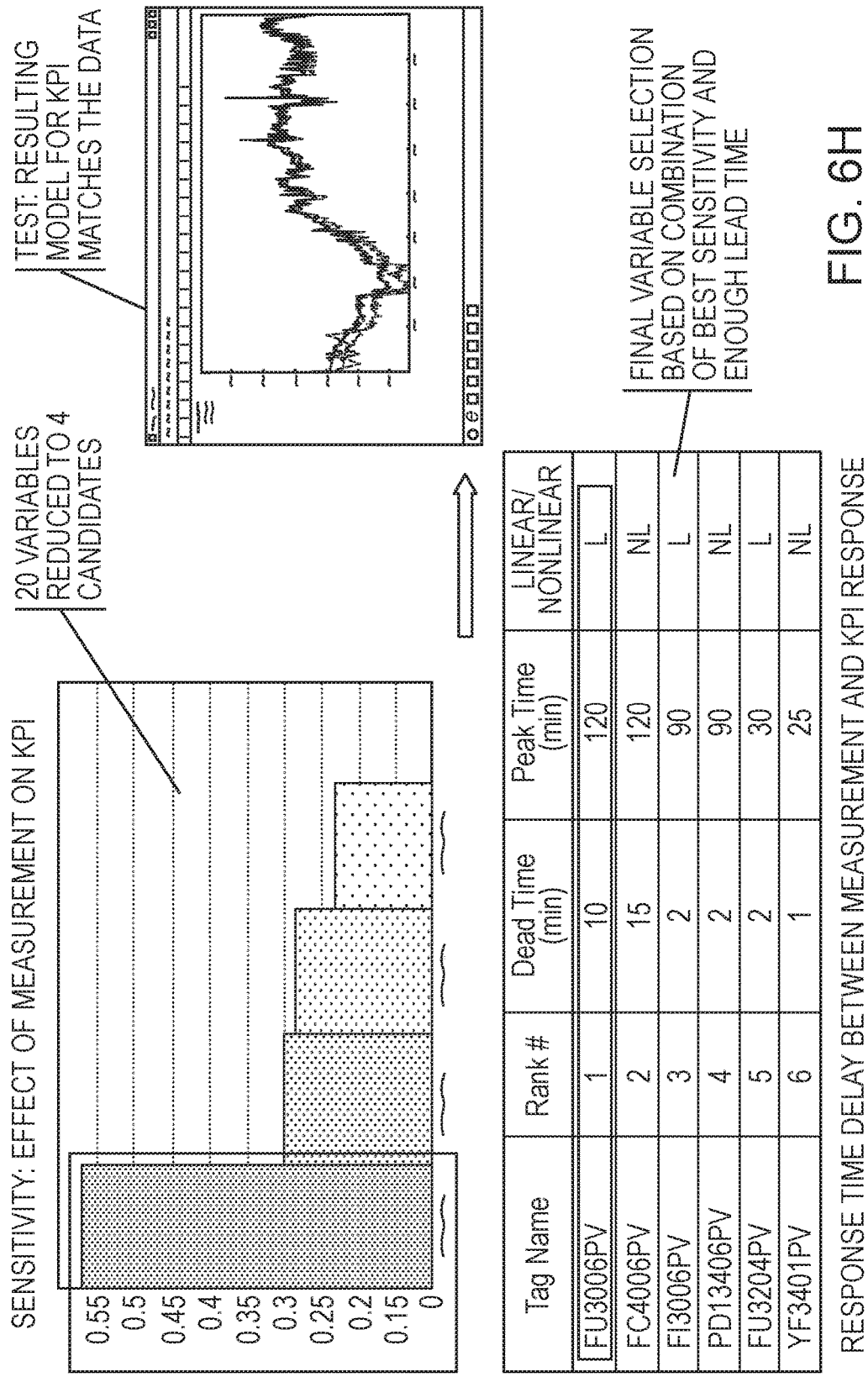
Figure 61:
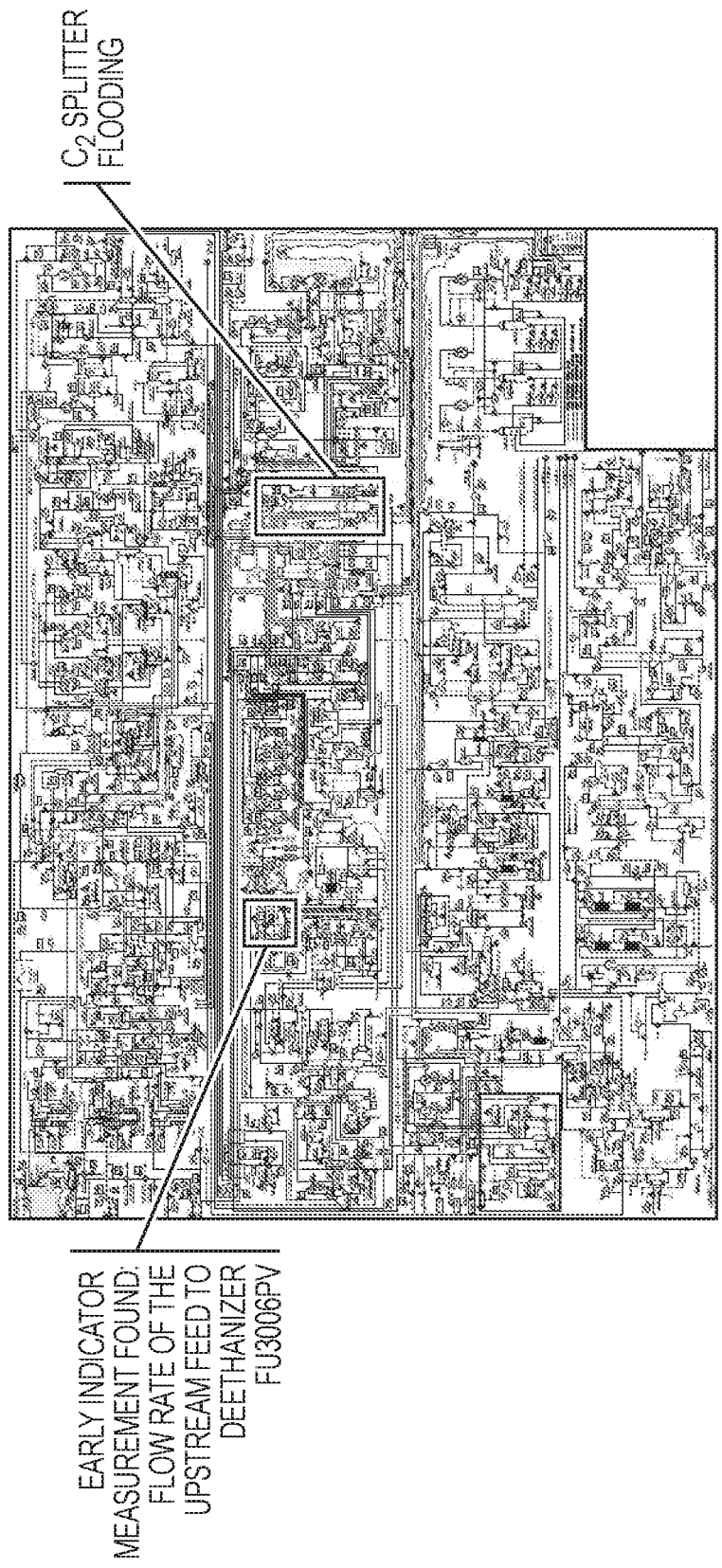

FIGS. 6H-6I illustrate processing of the 20 precursor candidates remaining after the above discovery processes to further reduce the process variables to an even smaller set of precursor candidates based on causality analysis. The processing includes building a parametric model that calculates a score for each remaining process variable (identified as a precursor candidate) based on its strength of correlation to the C2 splitter flooding relevant KPIs. As shown in FIG. 6H, the strength of correlation is determined based on relative sensitivity (i.e., relevant effect of the measurement on each respective KPI), which in the sample field study reduces the number of process variables to 4 remaining candidates. The strength of correlation is further determined based on event lead-time (e.g., response time delay between the measurement and the respective KPI response), which reduces the number of process variables to 1 dominating candidate (FU3006PV—flow rate of the upstream feed to Deethanizer). As shown in FIG. 6H, the resulting model predictions for the C2 splitter flooding relevant KPI matches the KPI data well. FIG. 6I illustrates that from this analysis (of FIGS. 6A-6H) that the FU3006PV upstream flow rate of feed to Deethanizer should be used as the precursor for predicting C2 splitter flooding in the plant.

Digital Processing Environment

Figure 7:
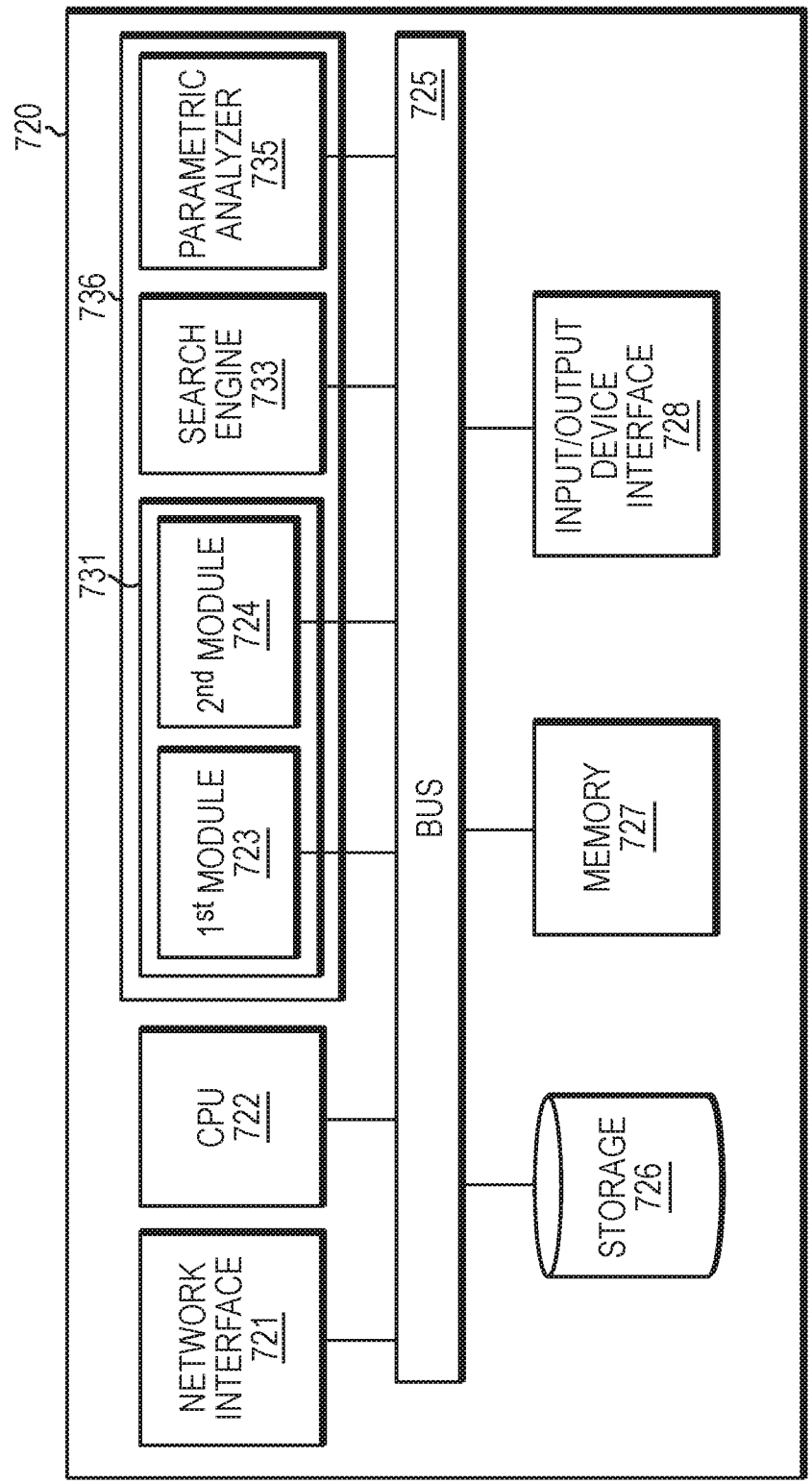
FIG. 7 is a block diagram of a computer (or digital processing) system for performing root-cause-analysis according to at least one embodiment of the present invention.

FIG. 7 is a simplified block diagram of a computer-based system 720 for performing root-cause-analysis according to some embodiments of the present invention detailed above. The system 720 comprises a bus 725. The bus 725 serves as an interconnector between the various components of the system 720. Connected to the bus 725 is an input/output device interface 728 for connecting various input and output devices such as a keyboard, mouse, display, speakers, controller, etc. to the system 720. A central processing unit (CPU) 722 is connected to the bus 725 and provides for the execution of computer instructions. Memory 727 provides volatile storage for data used for carrying out computer instructions. Storage 726 provides non-volatile storage for software instructions, such as an operating system (not shown). In particular, memory 727 and/or storage 726 are configured with program instructions implementing methods 200, 400, and 500 for calibrating the first principle model and training the inferential model in FIG. 2A, searching for precursor candidates in FIG. 4, and determining root-cause variables in FIGS. 5A-5B. The system 720 also comprises a network interface 721 for connecting to any variety of networks known in the art, including cloud, wide area networks (WANs) and local area networks (LANs).

Further connected to the bus 725 is a first principles primary analyzer module 723. The first principles primary analyzer module 723 calculates KPIs using the first principles model 268, 302 when in steady-state as detailed above in FIGS. 2B and 3A-3B. The first principles primary analyzer module 723 may calibrate the first principles model 268, 302 to calculate KPIs by any means known in the art. For example, the first principles primary analyzer module 723 may reference training data that is stored on the storage device 726 or memory 727, such as a historian database, for calibrating the model 268, 302. For further example, the first principles primary analyzer module 723 may receive input data from any point communicatively coupled to the system 720 via the network interface 721 and/or input/output device interface 728.

The system 720 further comprises a secondary inferential analyzer module 724 that is communicatively/operatively coupled to the first principles primary analyzer module 723. The secondary inferential analyzer module 724 is configured to generate continuous estimates of KPIs as described above in FIGS. 2A-3B. The secondary inferential analyzer module 724 may estimate KPIs through any means known in the art. For example, the secondary inferential analyzer module 724 may access historical data, such as in an array, on the storage device 726 or memory 727. For another example, the secondary inferential analyzer module 724 may process input data using the CPU 722 via the bus 725. For further example, the target optimizer module 724 may retrieve the input data from any point of the plant communicatively coupled to the system 720 via the network interface 721 and/or input/output device interface 728.

The system 720 further comprises a search engine 733 and parametric analyzer 735 as part of a root-cause analysis module 736 that is communicatively/operatively coupled to the first principles primary analyzer module 723 and secondary inferential analyzer module 724. The first principles primary analyzer module 723 and secondary inferential analyzer module 724 from hybrid analyzer 731, such as at 260, 300 detailed above in FIGS. 2A-3A, of the root cause analyzer 736. Root cause analyzer (analyzer module) 736 performs and operates as described for computers 101, 102 in FIG. 1. The search engine 733 performs the method 400 of FIG. 4, but may determine precursor candidates from process variables through any means known in the art. Further, the parametric analyzer 735 filters the precursor candidates to determine root-cause values as detailed in method 500 of FIG. 5 or through any means know in the art. For example, the search engine 733 and parametric analyzer 735 may access historical data, such as in an array, on the storage device 726 or memory 727. For another example, the search engine 733 and parametric analyzer 735 may process KPI data from the inferential analyzer module 724 using the CPU 722 via the bus 725. For further example, the search engine 733 and parametric analyzer 735 may retrieve the input data from any point of the plant communicatively coupled to the system 720 via the network interface 721 and/or input/output device interface 728.

It should be understood that the example embodiments described herein may be implemented in many different way. In some instances, the various methods and machines described herein may each be implemented by a physical, virtual, or hybrid general purpose computer, such as the computer system 720. The computer system 720 may be transformed into the machines that execute the methods described herein, for example, by loading software instructions into either memory 727 or non-volatile storage 726 for execution by the CPU 722. Further, while the principles primary analyzer 723, secondary inferential analyzer module 724, search engine module, and parametric analyzer module are shown as separate modules, in an example embodiment these modules may be implemented using a variety of configurations, included implemented together as a root-cause analyzer module.

The system 720 and its various components may be configured to carry out any embodiments of the present invention described herein. For example, the system 720 may be configured to carry out the methods 200, 400, and 500 described hereinabove in relation to FIGS. 2A, 4, and 5A. In an example embodiment, the first principle primary analyzer module 723, secondary inferential analyzer module 724, search engine 733, and parametric analyzer 735 may be implemented in software that is stored on the memory 727 and/or storage device 726. In such an example embodiment, the CPU 722 and the memory 727 with computer code instructions stored on the memory 727 and/or storage device 726 implement a first principle primary analyzer module that calculates KPI values. Further, the components of the system 720 implement a secondary inferential analyzer module that is operatively coupled to generate continuous estimates of KPIs. In addition, the components of the system 720 implement a search engine that is operatively coupled to search for precursor candidates from the measured process variables based on the KPIs, and implement a parametric analyzer that is operatively coupled to filter the precursor candidates to determine root-cause variables for analysis.

Figure 8:
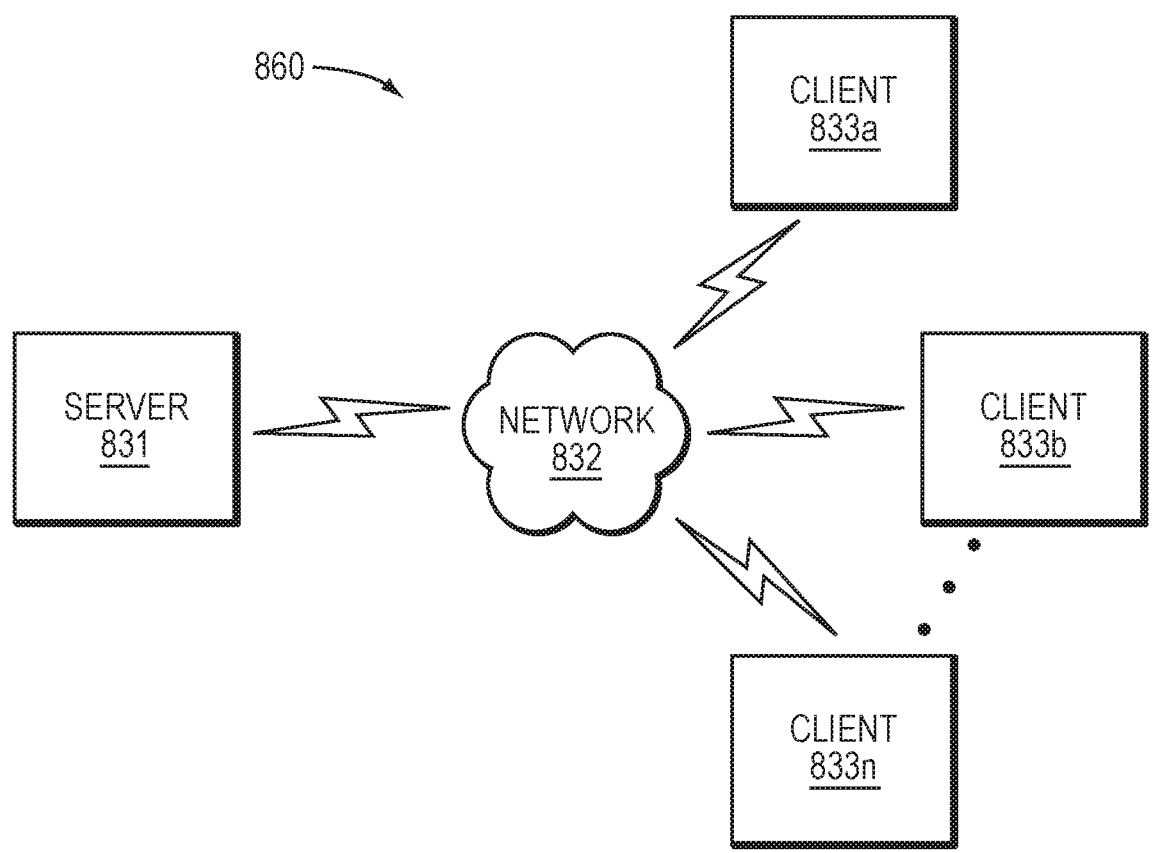
FIG. 8 is a schematic diagram of an example computer network environment in which embodiments of the invention may be implemented.

FIG. 8 illustrates a computer network environment 860 in which an embodiment of the present invention may be implemented. In the computer network environment 860, the server 831 is linked through the communications network 832 to the clients 833*a-n*. The environment 860 may be used to allow the clients 833*a-n*, alone or in combination with server 831, to execute any of the methods described hereinabove. It should be understood that the example embodiments described above may be implemented in many different ways. In some instances, the various methods and machines described herein may each be implemented by a physical, virtual, or hybrid general purpose computer, or a computer network environment such as the computer environment 860.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

The teachings of all patents, published applications and references cited herein are incorporated by reference in their entirety.

EXEMPLARY

The following pseudo code may be used for implementing example embodiments of the present invention.

```
function find_precursors(fld_var_lbl, active_variables, time_series_df, search_setup):
    sel_active_variables = cut_low_global_corr(time_series_df, active_variables, search_setup)
    sel_cont_active_variables = cut_discrete_ts(time_series_df, sel_active_variables, search_setup)
    tser = time_series_df[fld_var_lbl].iloc[search_setup.ts_range_min : search_setup.ts_range_max]
    acceptable_ranges = select_ranges(tser, search_setup, search_setup.ts_range_min)
    (cum_corr_vec, lag_index_dict) = init_lag_storage(search_setup)
    cum_corr_tags = init_3d_df( cum_corr_vec, len(acceptable_ranges), False)
    cum_corr_vals = init_3d_df( cum_corr_vec, len(acceptable_ranges))
    range_ind = 0
    for u in acceptable_ranges:
        update_correlated( time_series_df,
                sel_cont_active_variables,
                cum_corr_tags, cum_corr_vals,
                range_ind,
                u[1], u[2],
                lag_index_dict,
                search_setup)
            range_ind += 1
    precursor_data = select_precursor_tags(time_series_df,
                cum_corr_tags, cum_corr_vals,
                acceptable_ranges,
                lag_index_dict,
                search_setup)
    return {'refined_pred_list': precursor_data[0], 'pred_dict': precursor_data[1],
        'pred_corr':precursor_data[2]}
function cut_low_global_corr(time_series_df, active_variables, analysis_obj):
    passed_corr = [ ]
    vec_base = time_series_df[active_variables[-1]].values
    for u in active_variables[:-1]:
        vec_u = time_series_df[u].values
        cr = corrcoef( vec_u, vec_base )[0][1]
        if abs(cr)>analysis_obj.full_ts_corr_cutoff:
            passed_corr.append(u)
    return passed_corr
function cut_discrete_ts(time_series_df, active_variables, analysis_obj):
    passed = [ ]
    for u in active_variables:
        if len( set( time_series_df[u].values ) ) > analysis_obj.min_discr_levels:
            passed.append(u)
    return passed
function select_ranges( tser, analysis_obj, start_indx=0 ):
    ser_len = len(tser)
    abs_cutoff_large_moves = analysis_obj.cutoff_large_moves * timeseries_range(0, ser_len, tser)
    return list_timeseries_ranges(
            abs_cutoff_large_moves,
            range(0, ser_len, analysis_obj.chunk_length),
            tser,
            start_indx )
function list_timeseries_ranges( cutoff, lst, ser, start_indx=0 ):
    v = [ ]
    for i in range(1,len(lst)):
        range_i = timeseries_range(lst[i-1], lst[i], ser)
        if range_i>cutoff:
            v.append( [i, lst[i-1]+start_indx, lst[i]+start_indx, range_i] )
    return v
```

```
function init_lag_storage( analysis_obj ):
        cum_corr_vec = [ ]
        lag_index_dict = { }
        ii = 0
        for u in range(analysis_obj.min_lag, analysis_obj.max_lag, analysis_obj.lag_interval):
            if u!=0:
               cum_corr_vec.append( analysis_obj.select_cnt )
               lag_index_dict[ii] = u
               ii += 1
        return (cum_corr_vec, lag_index_dict)
function init_3d_df(rowset_lengths, column_count, numeric=True):
        first_idx = [ ]
        second_idx = [ ]
        rr_i = 0
        for rr in rowset_lengths:
            first_idx = first_idx + [rr_i for u in range(rr)]
            second_idx = second_idx + range(rr)
            rr_i += 1
        multi_idx = [first_idx, second_idx]
        column_idx = range(column_count)
        if numeric:
            return DataFrame( \
               zeros(( len(first_idx),column_count)), \
               index=MultiIndex.from_tuples(zip(*multi_idx)), \
               columns=column_idx)
        else:
            vec_of_vec=[ ]
            for j in range(len(first_idx)):
               vec_of_vec.append( [" for u in range(column_count)] )
            return DataFrame( \
                    vec_of_vec, \
                    index=MultiIndex.from_tuples(zip(*multi_idx)), \
                    columns=column_idx)
function update_correlated(time_series_df, active_variables, cum_corr_tags, cum_corr_vals,
range_ind, ind_0, ind_1, lag_index_dict, analysis_obj):
        for u in lag_index_dict.items( ):
            lag_ind = u[0]
            k = u[1]
            corr_summary = get_highest_corr(time_series_df, active_variables,
      analysis_obj.select_cnt, k, ind_0, ind_1)
            tags_k=[ ]
            vals_k=[ ]
            for u in corr_summary:
               tags_k.append( u[0] )
               vals_k.append( u[1] )
            cum_corr_tags[range_ind][lag_ind] = tags_k
            cum_corr_vals[range_ind][lag_ind] = vals_k
function get_highest_corr(time_series_df, active_variables, n, shift_k, hist_start, hist_end):
    high_corr = [ ]
    label_list = time_series_df.columns.values
    vec_base = time_series_df[label_list[-1]].values[hist_start:hist_end]
    for u in active_variables[:-1]:
       vec_u = time_series_df[u].values[hist_start:hist_end]
       cr = corrcoef( vec_u[:(-shift_k)] , vec_base[shift_k:])[0][1]
       high_corr.append([u, cr])
    high_corr.sort(key=lambda x: abs(x[1]), reverse=True)
    return high_corr[:n]
function select_precursor_tags(time_series_df, cum_corr_tags, cum_corr_vals,
acceptable_ranges, lag_index_dict, analysis_obj,
                lag_indices_post=None, lag_indices_pre=None, lst_ranges=None,
cutoff_signal=None, post_corr_tol=None ):
    if lst_ranges==None:
       lst_ranges = range(0, len(acceptable_ranges))
    if lag_indices_pre==None:
       lag_indices_pre = [ ]
       for u in lag_index_dict.items( ):
          if u[1]>0:
             lag_indices_pre.append(u[0])
    if lag_indices_post==None:
       lag_indices_post = [ ]
       for u in lag_index_dict.items( ):
          if (u[1]<0) and (abs(u[1])>analysis_obj.cross_corr_post_grace):
             lag_indices_post.append(u[0])
    sorted_pair_post = sort_cumul_corr(cum_corr_tags, cum_corr_vals, lag_indices_post,
lst_ranges, abs, analysis_obj)
    post_dict = { }
    for u in sorted_pair_post:
       post_dict[u[0]] = u[1]
    sorted_pairs_pred = sort_cumul_corr(cum_corr_tags, cum_corr_vals, lag_indices_pre,
```

```
lst_ranges, analysis_obj.pred_transform, analysis_obj)
predict_dict = { }
for u in sorted_pairs_pred:
    predict_dict[u[0]] = u[1]
if cutoff_signal==None:
    if len(sorted_pair_post) == 0:
        cutoff_signal = 0.00001
    else:
        cutoff_signal = 0.1 * abs( sorted_pair_post[0][1] )
if post_corr_tol==None:
    post_corr_tol = 0.2 * cutoff_signal
pred_dict = { }
pred_list = [ ]
for pred in sorted_pairs_pred:
    pred_tag = pred[0]
    pred_val = pred[1]
    post_val = safe_dict_value( post_dict, pred_tag )
    if analysis_obj.pre_to_post_cond != 'relative':
        if (abs(pred_val)> cutoff_signal) and (abs(post_val)<post_corr_tol):
            pred_list.append(pred_tag)
            pred_dict[pred_tag] = pred_val
    else:
        if abs(post_val)<1.e-14:
            pred_list.append(pred_tag)
            pred_dict[pred_tag] = pred_val
        else:
            if abs(pred_val/post_val) >= (1.0/analysis_obj.pre_to_post_tol):
                pred_list.append(pred_tag)
                pred_dict[pred_tag] = pred_val
df_corr = time_series_df[pred_list].corr( )
refined_pred_list = [ ]
ii = 0
for tag_name in pred_list:
    seq = df_corr[tag_name]
    if (ii==0) or (max(abs( seq[:ii] )) < analysis_obj.precursor_max_corr):
        refined_pred_list.append(tag_name)
    ii +=1
return (refined_pred_list, pred_dict, df_corr)
function sort_cumul_corr(cum_corr_tags, cum_corr_vals, lag_indices, lst_ranges, transform,
analysis_obj):
lag_corr = { }
for i_range in lst_ranges:
    for lag_index in lag_indices:
        for j in range(analysis_obj.select_cnt):
            tag_name = cum_corr_tags[i_range][lag_index][j]
            tag_corr = cum_corr_vals[i_range][lag_index][j]
            if not np.isnan(tag_corr):
                if tag_name in lag_corr.keys( ):
                    lag_corr[ tag_name ] += transform(tag_corr)
                else:
                    lag_corr[ tag_name ] = transform(tag_corr)
    i_range += 1
uvec = [u for u in lag_corr.items( )]
uvec.sort(key=lambda x: abs(x[1]), reverse=True)
    return uvec
```

| PLS algorithm |
| --- |
| function PLS1(X, y, l) |
| 2  $X^{(0)} \leftarrow X$ |
| 3  $w^{(0)} \leftarrow X^T y/\|X^T y\|$, an initial estimate of w. |
| 4  $t^{(0)} \leftarrow X w^{(0)}$ |
| 5  for k = 0 to l |
| 6      $t_k \leftarrow t^{(k)T} t^{(k)}$ (note this is a scalar) |
| 7      $t^{(k)} \leftarrow t^{(k)}/t_k$ |
| 8      $p^{(k)} \leftarrow X^{(k)T} t^{(k)}$ |
| 9      $q_k \leftarrow y^T t^{(k)}$ (note this is a scalar) |
| 10     if $q_k = 0$ |
| 11         $l \leftarrow k$, break the for loop |
| 12     if k < l |
| 13         $X^{(k+1)} \leftarrow X^{(k)} - t_k t^{(k)} p^{(k)T}$ |
| 14         $w^{(k+1)} \leftarrow X^{(k+1)T} y$ |
| 15         $t^{(k+1)} \leftarrow X^{(k+1)} w^{(k+1)}$ |
| 16 end for |
| 17 define W to be the matrix with columns $w^{(0)}, w^{(1)}, ..., w^{(l-1)}$. Do the same to form the P matrix and q vector. |
| 18 $B \leftarrow W(P^T W)^{-1} q$ |
| 19 $B_0 \leftarrow q_0 - P^{(0)T} B$ |
| 20 return B, $B_0$ |

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implement method for predicting key performance indicators (KPIs) of an industrial process, the method comprising:

building a hybrid model that models a subject industrial process, the hybrid model comprising a first-principles model as a primary model and an inferential model as a secondary model;

calibrating the first principles model of the built hybrid model in an offline configuration, including:
  selecting at least one measurable variable from process variables for the subject industrial process, loading process data for the selected at least one measurable variable, and
  training the first principles model using the loaded process data, said training enables the first principles model to calculate KPI values when the subject industrial process reaches a steady-state period;

calibrating the inferential model of the built hybrid model in an offline configuration, including:
  selecting a model structure to define the input-output data relationship of the inferential model, and
  based on the selected model structure, training the inferential model using: (i) the loaded process data as input, and (ii) steady-state KPI values calculated by the calibrated first principles model as output, said training enables the inferential model to continuously estimate KPI values when the subject industrial process reaches a non-steady-state period; and deploying the hybrid model online, the deployed hybrid model continuously predicting KPI values during steady-state and non-steady-state periods of the subject industrial process;

wherein calibrating the first principles model further includes at least one of:
  tuning model parameters of the first principles model to at least satisfy a hydraulic mass balance and a heat energy balance at a steady-state operating point; and
  tuning model parameters of the first principles model in a manner that minimizes model prediction errors in calculating KPI values, wherein the model parameters are tuned based on one or more constraints of the subject industrial process.

2. The method of claim 1, wherein the loaded process data comprises historical operating measurements collected for the selected at least one measurable variable, the historical operating measurements being retrieved from a historian database.

3. The method of claim 1, wherein an auto-data-slicing technique is applied to the loaded process data, the auto-data-slicing technique identifying and removing bad quality data from the loaded process data prior to use in calibrating the first principles model and the inferential model.

4. The method of claim 1, further comprising:
dynamically adjusting prediction bias in the inferential model of the deployed hybrid model, the dynamic adjusting being performed using KPI values calculated online during the steady-state periods.

5. The method of claim 1, further comprising:
detecting an operational change in the subject industrial process; and
in response to the detection, automatically re-calibrating the first principles model and the inferential model, wherein the re-calibrating maintains online performance of the hybrid model in predicting KPI values.

6. The method of claim 1, wherein the inferential model is one of a partial least squares (PLS) model, piecewise linear transformed nonlinear model, monotonic neural network (NN) model, or bounded derivative network (BDN) model.

7. The method of claim 1, wherein training the inferential model further comprises:
creating a dataset including: (a) the loaded process data, and (b) the steady-state KPI values calculated by the calibrated first principles model;
dividing the dataset into a training set and a validation set;
fitting the inferential model with the training set; and
using the validation set to minimize prediction error in the fitted inferential model.

8. The method of claim 1, further comprising:
applying the continuously predicted KPI values to predict behavior of the subject industrial process.

9. A computer system for predicting key performance indicators (KPIs) of an industrial process, the system comprising:
at least one processor coupled to computer memory, the at least one processor configured to:
  build a hybrid model that models a subject industrial process, the hybrid model comprising a first-principles model as a primary model and an inferential model as a secondary model;
  calibrate the first principles model of the built hybrid model in an offline configuration, including:
    selecting at least one measurable variable from process variables for the subject industrial process, loading process data for the selected at least one measurable variable, and
    training the first principles model using the loaded process data, said training enables the first principles model to calculate KPI values when the subject industrial process reaches a steady-state period;
  calibrate the inferential model of the built hybrid model in an offline configuration, including:
    selecting a model structure to define the input-output data relationship of the inferential model, and
    based on the selected model structure, training the inferential model using: (i) the loaded process data as input, and (ii) steady-state KPI values generated by the calibrated first principles model as output, said training enables the inferential model to continuously estimate KPI values when the subject industrial process reaches a non-steady-state period; and
  deploy the hybrid model online, the deployed hybrid model continuously predicting KPI values during steady-state and non-steady-state periods of the subject industrial process;
wherein the at least one processor is further configured to calibrate the first principles model by at least one of:
  tuning model parameters of the first principles model to at least satisfy a hydraulic mass balance and a heat energy balance at a steady-state operating point; and
  tuning model parameters of the first principles model in a manner that minimizes model prediction errors in calculating KPI values, wherein the model parameters are tuned based on one or more constraints of the subject industrial process.

10. The system of claim 9, wherein the loaded process data comprises historical operating measurements collected for the selected at least one measurable variable, the historical operating measurements being retrieved from a historian database.

11. The system of claim 9, wherein the at least one processor is further configured to:
apply an auto-data-slicing technique to the loaded process data, the auto-data-slicing technique identifying and removing bad quality data from the loaded process data prior to use in calibrating the first principles model and the inferential model.

12. The system of claim 9, wherein the at least one processor is further configured to:
dynamically adjust prediction bias in the inferential model of the deployed hybrid model, the at least one processor dynamic adjusts the prediction bias using KPI values calculated online during the steady-state periods.

13. The system of claim 9, wherein the at least one processor is further configured to:
detect an operational change in the subject industrial process; and
in response to the detection, automatically re-calibrate the first principles model and the inferential model, wherein the re-calibrating maintains online performance of the hybrid model in predicting KPI values.

14. The system of claim 9, wherein the inferential model is one of a partial least squares (PLS) model, piecewise linear transformed nonlinear model, monotonic neural network (NN) model, or bounded derivative network (BDN) model.

15. The system of claim 9, wherein the at least one processor is further configured to train the inferential model by:
creating a dataset including: (a) the loaded process data, and (b) the steady-state KPI values calculated by the calibrated first principles model;
dividing the dataset into a training set and a validation set;
fitting the inferential model with the training set; and
using the validation set to minimize prediction error in the fitted inferential model.

16. The system of claim 9, wherein the at least one processor is further configured to:
apply the continuously predicted KPI values to predict behavior of the subject industrial process.

17. A computer program product comprising:
a non-transitory computer-readable storage medium having code instructions stored thereon, the storage medium operatively coupled to a processor, such that, when executed by the processor to predict key performance indicators (KPIs) of an industrial process, the computer code instructions cause the processor to:
build a hybrid model that models a subject industrial process, the hybrid model comprising a first-principles model as a primary model and an inferential model as a secondary model;
calibrate the first principles model of the built hybrid model in an offline configuration, including:
selecting at least one measurable variable from process variables for the subject industrial process, loading process data for the selected at least one measurable variable, and
training the first principles model using the loaded process data, said training enables the first principles model to calculate KPI values when the subject industrial process reaches a steady-state period;
calibrate the inferential model of the built hybrid model in an offline configuration, including:
selecting a model structure to define the input-output data relationship of the inferential model, and
based on the selected model structure, training the inferential model using: (i) the loaded process data as input, and (ii) steady-state KPI values generated by the calibrated first principles model as output, said training enables the inferential model to continuously estimate KPI values when the subject industrial process reaches a non-steady-state period; and
deploy the hybrid model online, the deployed hybrid model continuously predicting KPI values during steady-state and non-steady-state periods of the subject industrial process;
wherein the computer code instructions further include code instructions that cause the processor to calibrate the first principles model by at least one of:
tuning model parameters of the first principles model to at least satisfy a hydraulic mass balance and a heat energy balance at a steady-state operating point; and
tuning model parameters of the first principles model in a manner that minimizes model prediction errors in calculating KPI values, wherein the model parameters are tuned based on one or more constraints of the subject industrial process.

* * * * *

UNITED STATES PATENT AND TRADEMARK OFFICE
CERTIFICATE OF CORRECTION

PATENT NO. : 10,739,752 B2  
APPLICATION NO. : 16/014280  
DATED : August 11, 2020  
INVENTOR(S) : Hong Zhao et al.

Page 1 of 1

It is certified that error appears in the above-identified patent and that said Letters Patent is hereby corrected as shown below:

On the Title Page

Item [73], delete "Aspen Technologies, Inc., Bedford, MA (US)" and replace with --Aspen Technology, Inc., Bedford, MA (US)--

Signed and Sealed this  
Sixth Day of October, 2020

Andrei Iancu  
*Director of the United States Patent and Trademark Office*